United States Patent
Despotopoulou et al.

(10) Patent No.: US 10,787,604 B2
(45) Date of Patent: *Sep. 29, 2020

(54) COLORED ORGANIC PEROXIDE COMPOSITIONS AND METHODS FOR BREAKING FLUIDS

(71) Applicant: Arkema Inc., King of Prussia, PA (US)

(72) Inventors: Marina Despotopoulou, Havertown, PA (US); Scot A. Swan, Norristown, PA (US); Leonard H. Palys, Downingtown, PA (US); Joseph M. Brennan, Swarthmore, PA (US); Michael B. Abrams, Bala Cynwyd, PA (US); Scott J. Schwartz, Princeton Junction, NJ (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/559,842

(22) PCT Filed: Mar. 10, 2016

(86) PCT No.: PCT/US2016/021656
§ 371 (c)(1),
(2) Date: Sep. 20, 2017

(87) PCT Pub. No.: WO2016/153792
PCT Pub. Date: Sep. 29, 2016

(65) Prior Publication Data
US 2018/0079952 A1    Mar. 22, 2018

Related U.S. Application Data

(60) Provisional application No. 62/137,882, filed on Mar. 25, 2015.

(51) Int. Cl.
*E21B 43/26* (2006.01)
*C09K 8/68* (2006.01)
(Continued)

(52) U.S. Cl.
CPC .............. *C09K 8/685* (2013.01); *C09K 8/665* (2013.01); *C09K 8/68* (2013.01); *C09K 8/845* (2013.01);
(Continued)

(58) Field of Classification Search
CPC .......... C09K 8/685; C09K 8/68; C09K 8/645; C09K 8/86; C09K 8/887; C09K 2208/26; E21B 43/26
See application file for complete search history.

(56) References Cited

U.S. PATENT DOCUMENTS

| 3,181,991 A |   | 5/1965 | Leveskis |
| 3,182,026 A | * | 5/1965 | Leveskis .................. C08F 4/32 502/160 |

(Continued)

FOREIGN PATENT DOCUMENTS

| EP | 2 024 481 B1 | 1/2011 |
| JP | 60203937 | 10/1985 |
| WO | WO 2014/133853 A1 | 9/2014 |

*Primary Examiner* — Silvana C Runyan
(74) *Attorney, Agent, or Firm* — Lynn B. Morreale

(57) ABSTRACT

A breaker composition for use in a fracturing fluid comprises at least one organic peroxide (e.g., tert-butyl hydroperoxide), at least one dye (e.g., an FD&C dye), and at least one alcohol (e.g., propylene glycol). A promoter composition for use in a fracturing fluid comprises at least one promoter (e.g., sodium thiosulfate), at least one dye (e.g., an FD&C dye). According to certain embodiments, the dye increases the efficiency of the promoter and/or the organic peroxide, so that the break time and the peak viscosity of the aqueous treatment fluid are reduced.

5 Claims, 11 Drawing Sheets

(51) Int. Cl.
 *C09K 8/86* (2006.01)
 *C09K 8/88* (2006.01)
 *C09K 8/90* (2006.01)
 *C09K 8/66* (2006.01)
 *C09K 8/84* (2006.01)

(52) U.S. Cl.
 CPC ............... *C09K 8/86* (2013.01); *C09K 8/887* (2013.01); *C09K 8/90* (2013.01); *E21B 43/26* (2013.01); *C09K 2208/26* (2013.01)

(56) References Cited

U.S. PATENT DOCUMENTS

| | | | |
|---|---|---|---|
| 3,806,477 A * | 4/1974 | Jaspers et al. | C08F 4/32 524/40 |
| 3,922,173 A | 11/1975 | Misak | |
| 4,552,675 A * | 11/1985 | Brown | C09K 8/08 166/271 |
| 5,234,711 A | 8/1993 | Kamen et al. | |
| 5,447,199 A | 9/1995 | Dawson et al. | |
| 5,486,550 A | 1/1996 | Lubas | |
| 5,880,181 A | 3/1999 | Torenbeek et al. | |
| 6,448,062 B1 * | 9/2002 | Huth | A61L 2/18 435/264 |
| 7,159,658 B2 * | 1/2007 | Frost | C09K 8/845 166/300 |
| 7,169,237 B2 * | 1/2007 | Wang | C01B 15/037 134/42 |
| 8,383,557 B2 | 2/2013 | Huang et al. | |
| 2003/0027903 A1 | 2/2003 | Nwoko et al. | |
| 2003/0235549 A1 * | 12/2003 | Singh | A61K 8/0208 424/70.13 |
| 2006/0034905 A1 * | 2/2006 | Singh | A61K 9/006 424/449 |
| 2006/0289160 A1 | 12/2006 | Van Batenburg et al. | |
| 2008/0202758 A1 | 8/2008 | Delorey et al. | |
| 2011/0247821 A1 | 10/2011 | Thompson et al. | |
| 2012/0220503 A1 | 8/2012 | Sanchez Reyes et al. | |
| 2013/0213657 A1 | 8/2013 | Dobson, Jr. | |
| 2013/0324445 A1 | 12/2013 | Quintero et al. | |
| 2014/0178324 A1 | 6/2014 | Martinez-Castro et al. | |
| 2016/0177162 A1 * | 6/2016 | Nguyen | C09K 8/575 166/300 |

\* cited by examiner

Viscosity vs Time at 190F

Grace 5600 Rheometer: 25# Guar/Mgal water at 170F

Grace 5600 Rheometer:: 25# Guar/MGal water @190F, 40sec-1

Colored Breaker Plus Colored Promoter v.s. Colorless Breaker

Unstable Blue Colored t-Butyl Hydroperoxide Solution b* approaching zero (colorless) for a Blue Colored t-Butyl Hydroperoxide with no Hydroxyl Stabilizer at 35C Color Stable Blue t-butyl Hydroperoxide Solution of the Invention Consistent b* (blue dye color stability) in t-Butyl Hydroperoxide with Glycerin @35C for 5.5 months Color Stable Red t-butyl Hydroperoxide Solution of the Invention Red 35C with 0.75% Propylene Glycol Color Stable Blue 30% Sodium Thiosulfate Solution of the Invention Consistent b* values for Blue Colored Promoter at 35C
with 0.95wt % Propylene Glycol Color Stable Grape 30% Sodium Thiosulfate Sodium of the Invention Consistent b* values for Grape Promoter at 35C with 0.95% Propylene Glycol Luperox® 101 Stable Blue Color based on b* Spectral Data DYBP Stable Blue Color based on b* Spectral Data Luperox® 231 Stable Blue Color based on b* Spectral Data Luperox® D16 Stable Blue Color based on b* Spectral Data Luperox® DI Stable Blue Color based on b* Spectral Data Luperox® DTA Stable Blue Color based on b* Spectral Data Luperox® CU80 Stable Blue Color based on b* Spectral Data Luperox® DiBHP Stable Green Color based on a* Spectral Data Luperox® PStable Red Color based on a* Spectral Data Luperox® TBEC Stable Red Color based on a* Spectral Data

COLORED ORGANIC PEROXIDE COMPOSITIONS AND METHODS FOR BREAKING FLUIDS

CROSS-REFERENCE TO RELATED APPLICATIONS

This application is a national stage application under 35 U.S.C. § 371 of PCT/US2016/021656 filed Mar. 10, 2016, which claims benefit to U.S. patent application Ser. No. 62/137,882, filed Mar. 25, 2015.

FIELD OF THE INVENTION

The present invention relates to colored breaking compositions and methods for using the breaking compositions to fracture subterranean formations in oil and gas recovery.

BACKGROUND OF THE INVENTION

Hydraulic fracturing is a technique commonly used to stimulate the production of oil and gas from subterranean geologic formations of low permeability. The process is carried out by drilling a wellbore that penetrates the formation and provides a sufficiently unimpeded flowpath for the hydrocarbons to reach the surface. In such treatments, aqueous treatment fluids (also known as fracturing fluids) are introduced into the subterranean formation under sufficient pressure and having sufficient viscosity to create fractures in the formation and to propagate these fractures out into the formation. The aqueous treatment fluids may contain entrained proppants, such as sand or sintered bauxite, so that as the aqueous treatment fluid seeps into the formation, the fractures close upon the proppants to maintain the fractures in an open state for increased permeability.

In using certain aqueous treatment fluids, the high viscosity of the fluids should be maintained while the fractures are being created and propagated, in order to aid in transporting the proppants to the farthest reaches of the fractures. After the proppants have been trapped in the fractures, however, it is desirable that the viscosity of the aqueous treatment fluid is quickly reduced to allow the fluid to flow back through the fractures, around the proppants, and back into the wellbore. Compositions utilized to reduce the viscosity of fracturing fluids are commonly called "breakers" or "breaker fluids." A breaker may be added to the fractures externally, i.e., separately from the fracturing fluid. Alternatively, an internal breaker may be incorporated into the initial fracturing fluid.

Breakers have previously included oxidizers, acids, and enzymes that degrade the polymeric gel structure of fracturing fluids. "Promoters" or promoter compositions may be added to aqueous treatment fluids to promote or accelerate the degradation of the gelling agent.

U.S. Pat. No. 3,922,173 is directed to processes for producing a controlled reduction in viscosity of aqueous gels when t-butyl hydroperoxide is used as a breaker.

U.S. Pat. No. 5,447,199 is directed to breakers comprising organic peroxides that have a water solubility of about 1 g/100 g or less.

U.S. Pat. No. 8,383,557 is directed to breaker compositions in the form of oil-water emulsions.

U.S. Publication No. 2008/0202758 is directed to breaker compositions that include an organic peroxide and a diluent comprising an organic solvent.

U.S. Publication No. 2011/0247821 is directed to breaker compositions comprising oxidative components and ester components.

U.S. Publication No. 2013/0324445 is directed to breaker compositions that are microemulsions or nanoemulsions.

Peroxide compositions have previously included colored components: U.S. Pat. No. 3,181,991 is directed to pigmented peroxide compositions; and U.S. Publication No. 2003/0027903 is directed to colored peroxide and polyester formulations.

A common problem with breakers is they are often difficult to control. For example, the breakers may not begin to reduce the viscosity of an aqueous treatment fluid for a prolonged period of time after the proppants are deposited. Thus, the breakers may fail to break down the aqueous treatment fluids rapidly enough to meet needs. Control over the timing of viscosity reduction is highly desirable in subterranean treatment operations such as fluid fracturing.

Also, it has been difficult to develop colored organic peroxide compositions that remain color-stable because dyes often fade significantly or precipitate out of solution after a short period of time. Thus, there remains a need for colored organic peroxide compositions that are color-stable for a longer period of time.

SUMMARY OF THE INVENTION

The present invention provides aqueous treatment fluids (also referred to as "fracturing fluids," "fracture fluids," or "high viscosity aqueous gels") whereby the amount of time that it takes for the aqueous treatment fluid to break is unexpectedly and advantageously lowered through the introduction of at least one dye such as, for example, an FD&C dye (e.g., FD&C Blue #1 and/or FD&C Red #40 and/or FD&C Red #3 and/or FD&C Yellow #6). In one embodiment of the invention, the dye is included in a breaker composition comprising at least one organic peroxide.

It has previously been difficult to develop colored organic peroxide compositions that remain color-stable because the dyes often fade significantly or precipitate out of solution after a short period of time. Thus, there remains a need for colored organic peroxide compositions that are color-stable for a longer period of time. The inclusion of a colored dye in an organic peroxide composition makes the composition more easily identifiable (to differentiate the composition from other compositions, or to permit rapid identification of leaked or spilled material at a worksite). The added color also provides a visual aid to help the operator confirm an adequate flow and uniform mixing of the composition with other components, and to allow operators to easily identify the level of liquid in a tote or container. Colored solutions may also provide performance benefits including reduced break time, equivalent break time but at lower temperatures, and improved viscosity control at the front end of the break relative to their uncolored counterparts.

In another embodiment of the invention, the dye is included in a composition comprising at least one promoter. "Promoters" may be added to aqueous treatment fluids to promote or accelerate the degradation of the gelling agent.

In one aspect of the invention, incorporation of the dye into the aqueous treatment fluid shortens the amount of time that it takes the peroxide to degrade the polymer. In another aspect of the invention, incorporation of the dye into the aqueous treatment fluid reduces the peak viscosity of the aqueous treatment fluid before the peroxide degrades the polymer.

Embodiments of the present invention relate to a breaker composition for use in an aqueous treatment fluid, the breaker composition comprising, consisting essentially of, or consisting of:
- at least one organic peroxide (e.g., tert-butyl hydroperoxide),
- at least one dye (e.g., an FD&C dye),
- at least one alcohol (e.g., propylene glycol), and
- optionally water.

The breaker composition may optionally include at least one promoter. According to particular embodiments, the breaker composition reduces the "break time" and/or the peak viscosity of the aqueous treatment fluid in comparison to a breaker composition that does not include any dyes.

Embodiments of the present invention also relate to an aqueous treatment fluid comprising, consisting essentially of, or consisting of:
- water;
- at least one gelling agent;
- at least one crosslinking agent; and
- a breaker composition comprising, consisting essentially of, or consisting of: at least one organic peroxide, at least one dye, and at least one alcohol.

Embodiments of the present invention also relate to a promoter composition for use in an aqueous treatment fluid, the promoter composition comprising, consisting essentially of, or consisting of:
- at least one promoter (e.g., sodium thiosulfate), and
- at least one dye (e.g., an FD&C dye).

According to particular embodiments, the promoter composition is combined with a breaker composition in order to promote or accelerate the degradation of the gelling agent in the aqueous treatment fluid.

Embodiments of the present invention also relate to a promoter composition for use in an aqueous treatment fluid, the promoter composition comprising, consisting essentially of, or consisting of:
- at least one promoter (e.g., sodium thiosulfate),
- at least one dye (e.g., an FD&C dye), and
- at least one alcohol.

According to particular embodiments, the promoter composition is combined with a breaker composition in order to promote or accelerate the degradation of the gelling agent in the aqueous treatment fluid, wherein the alcohol unexpectedly prevents rehealing.

According to certain embodiments, the dye increases the efficiency of the promoter and/or the organic peroxide, so that the break time and/or the peak viscosity of the aqueous treatment fluid are reduced.

Embodiments of the present invention also relate to an aqueous treatment fluid comprising:
- water;
- at least one gelling agent;
- at least one crosslinking agent;
- a breaker composition comprising, consisting essentially of, or consisting of at least one organic peroxide, optionally at least one dye, and optionally at least one alcohol; and
- a promoter composition comprising, consisting essentially of, or consisting of at least one promoter and at least one dye.

Embodiments of the present invention also relate to an aqueous treatment fluid comprising:
- water;
- at least one gelling agent;
- one or more optional surfactants;
- a breaker composition comprising, consisting essentially of, or consisting of at least one organic peroxide, optionally at least one dye, and optionally at least one alcohol; and
- a promoter composition comprising, consisting essentially of, or consisting of at least one promoter and at least one dye,
- wherein the aqueous treatment fluid does not include any crosslinking agents.

Embodiments of the present invention also relate to a method for reducing the break time of an aqueous treatment fluid, said method comprising, consisting essentially of, or consisting of combining a breaker composition of the present invention with the aqueous treatment fluid. A promoter composition of the present invention may also be added to the aqueous treatment fluid.

Embodiments of the present invention also relate to a method for fracturing a subterranean formation comprising, consisting essentially of, or consisting of:
- injecting into the subterranean formation under fracturing conditions an aqueous treatment fluid, a breaker composition, and an optional promoter composition,
- wherein the aqueous treatment fluid comprises a gelling agent and a crosslinking agent,
- wherein the breaker composition comprises, consists essentially of, or consists of at least one peroxide, at least one dye, and at least one alcohol, and
- wherein the optional promoter composition comprises, consists essentially of, or consists of at least one promoter and at least one optional dye.

Embodiments of the present invention also relate to a method for fracturing a subterranean formation comprising, consisting essentially of, or consisting of:
- injecting into the subterranean formation under fracturing conditions an aqueous treatment fluid, a breaker composition, and a promoter composition,
- wherein the aqueous treatment fluid comprises a gelling agent and a crosslinking agent,
- wherein the breaker composition comprises, consists essentially of, or consists of at least one peroxide, at least one optional dye, and at least one optional alcohol, and
- wherein the optional promoter composition comprises, consists essentially of, or consists of at least one promoter and at least one dye.

BRIEF DESCRIPTION OF THE DRAWINGS

FIGS. 1-3 demonstrate that a reduced break time and reduced peak viscosity of a fracture fluid were observed when both the breaker composition and the promoter composition contained a dye.

FIG. 4 pertains to the colored compositions of the invention. FIG. 5 is a comparative.

DETAILED DESCRIPTION

Figure 1:
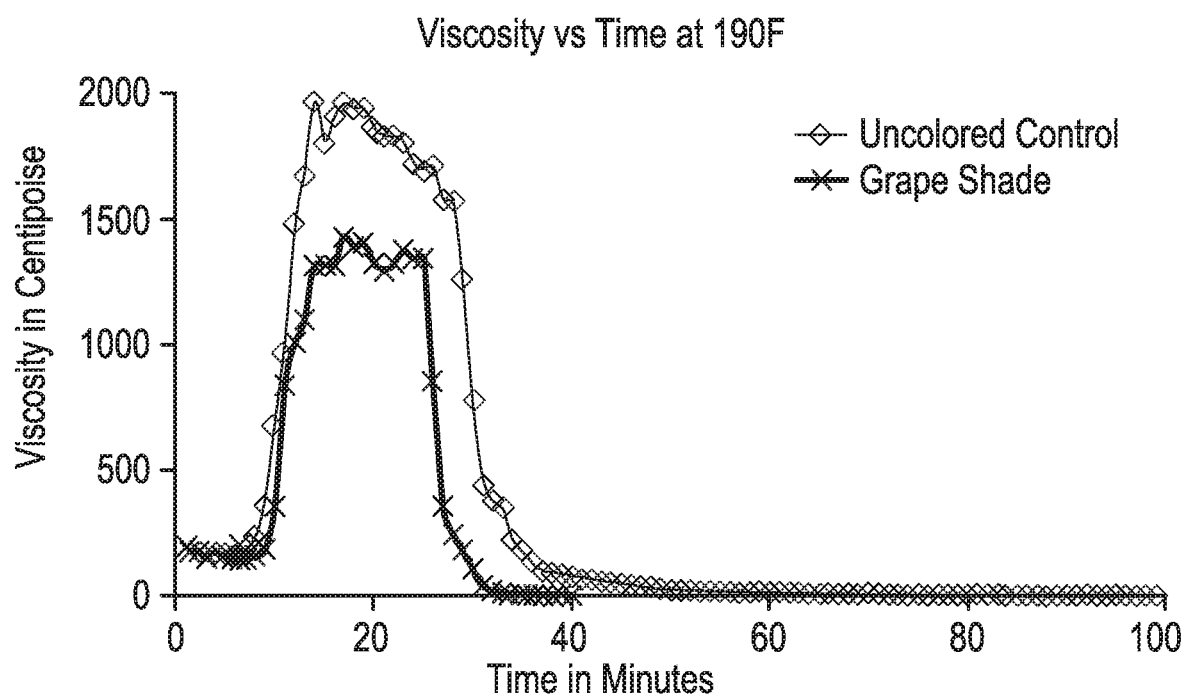
FIGS. 1-3 pertain to Example 1.

"Aqueous treatment fluid" or "fracturing fluid" or "fracture fluid" are used herein interchangeably to mean a fluid suitable for use in fracturing, gravel packing, and/or acidizing fluids, and the like. In particular, the aqueous treatment fluid is suitable for use in hydraulic fracturing operations for oil and gas recovery, including fracking.

"Breaker," "breaking composition," or "breaking fluid" are used herein to mean a composition that reduces the viscosity of the aqueous treatment fluid. Most broadly, breakers may work in any suitable manner, for example, by degrading the gelling agents (also referred to as viscosifying polymers) in an aqueous treatment fluid by attacking the cross-links, cleaving the polymer chain, or the like, or by other mechanisms, including mechanisms specific to a particular breaker, breaking composition, or breaking fluid. Various viscosifying polymers known in the art can be used in the practice of the present invention.

As used herein, "viscosity" has its ordinary meaning: a measure of the internal resistance of a fluid (or a measure of fluid friction). A fluid with a higher viscosity is "thicker" than a fluid with a lower viscosity. Appropriate viscosities of the aqueous treatment fluid during fracturing and recovery of the aqueous treatment fluid are readily ascertainable by one skilled in the art.

As used herein, "breaking" the aqueous treatment fluid means reducing the viscosity of the aqueous treatment fluid. Breaking typically occurs due to the degradation, breakdown or decomposition of the polymer in the aqueous treatment fluid.

In broad terms, as used herein, "breaking temperature" refers to between about 90° F. and about 500° F., or between about 90° F. and 300° F., or between about 100° F. and about 280° F., or between about 170° F. and about 230° F., or between about 180° F. and about 250° F., or between about 200° F. and about 240° F.

As used herein, "break time" is the amount of time it takes an aqueous treatment fluid's viscosity to be reduced to less than 100 cps, preferably to less than 50 cps, or less than 30 cps, or less than 10 cps, following the addition of an organic peroxide, i.e., the break time is measured from the time that an organic peroxide is added to an aqueous treatment fluid to the time that the aqueous treatment fluid's viscosity reaches less than 100 cps, or less than 50 cps, or less than 30 cps, or less than 10 cps.

As used herein, "peak viscosity" refers to the highest viscosity reached by an aqueous treatment fluid after all the components of the aqueous treatment fluid (including the gelling agent and crosslinking agent) have been added and the temperature has been raised to 90-300° F.

As used herein, "room temperature" refers to about 20° C. to about 30° C. (about 68° F. to about 86° F.), more preferably about 25° C. (about 77° F.).

As used herein, unless specified otherwise, the values of the constituents or components of the compositions are expressed in weight percent or percent by weight of each ingredient in the composition.

As used herein, "completely color stable" means that the color of the composition does not visibly change to the naked eye over a specified period of time (e.g., over 1 month or 3 months). "Substantially color stable" means that the color of the composition changes slightly to the naked eye over a specified period of time (e.g., over 1 month or 3 months), i.e., the color slightly changes or slightly fades. Color may be more quantitatively determined by acquiring optical spectra of the solutions and then calculating the transmitted intensity (e.g. percent transmission) of light at one or more wavelengths, or by calculating color and lightness parameters well-known in the art (e.g., CIELAB 1976 color space parameters L*, a*, b*, and/or E*).

After fracturing has been completed at high temperatures, highly viscous aqueous treatment fluids need to be degraded by a breaker to allow the gas or oil to flow from the fractured rock that is propped open by a proppant. A common problem with breakers is that they can be difficult to control. For example, the breakers may not begin to reduce the viscosity of an aqueous treatment fluid for a prolonged period of time after the proppants are deposited. Thus, the breakers may fail to break down the aqueous treatment fluids rapidly enough. There is a need for breakers that enable users to reduce the viscosity of an aqueous treatment fluid more efficiently during subterranean treatment operations.

One aspect of the present invention relates to a breaker composition for use in an aqueous treatment fluid, the breaker composition comprising, consisting essentially of, or consisting of at least one organic peroxide, at least one dye, and at least one alcohol.

Another aspect of the present invention relates to a promoter composition for use in an aqueous treatment fluid, the promoter composition comprising, consisting essentially of, or consisting of at least one promoter and at least one dye.

According to particular embodiments, a breaker composition and a promoter composition are both added to an aqueous treatment fluid. In this case, either one or both of the breaker composition and promoter composition include at least one dye. Thus, according to certain embodiments, a dye is not included in the breaker composition, but is included in the promoter composition that is combined with the breaker composition. According to additional embodiments, the at least one dye is included in both the breaker composition and the promoter composition.

The dye(s) that are included in the breaker compositions and promoter compositions of the present invention are preferably stable (i.e., they do not exhibit a substantial color change, as determined by a visual inspection of the composition) over a wide range of temperatures for a prolonged period time. For example, the dye(s) are preferably stable in the compositions between temperatures of −30° F. and 90° F., or between −10° F. and 90° F. The dye(s) are also preferably stable in the compositions for at least three months, more preferably at least four months or five months, most preferably at least six months. It is also preferred that the dye(s) are compatible with the components of the breaker composition or promoter composition so that they do not decrease the efficacy of the compositions.

In accordance with particular embodiments, the breaker composition and promoter composition of the present invention preferably exhibit one or more of the following features:

(1) According to particular embodiments, the colored breaker composition and colored promoter composition of the present invention exhibit no visible precipitation of solids (as observed by the naked eye). For example, the colored breaker composition and colored promoter composition exhibit no visible precipitation of solids after at least one month, at least three months, at least six months, at least nine months, or at least twelve months following preparation of the composition.

(2) According to particular embodiments, the organic peroxide(s) included in the colored breaker composition and colored promoter composition of the present invention remain stable and do not exhibit substantial decomposition over time. For example, the peroxide(s) exhibit less decomposition after a period of time compared to a breaker composition or promoter composition that is identical except that it does not include one or more dyes.

(3) According to particular embodiments, the inclusion of one or more dyes in the breaker composition or promoter composition of the present invention does not reduce the activity level of the promoter. Stated another way, the one or more dye(s) do not impede the ability of the promoter to promote or accelerate the degradation of the gelling agent.

(4) According to particular embodiments, the colored breaker composition and colored promoter composition of the present invention exhibit a high level of color stability, such that the color remains the same, or substantially the same, over a period of time. For example, the breaker composition and promoter composition may exhibit a change in color that is less than 5%, less than 10%, less than 15%, less than 20%, less than 25%, less than 30%, less than 35%, less than 35%, or less than 40% over a period of at least one month, at least three months, at least six months, at least nine months, or at least twelve months. Preferably, color change is measured in accordance with the following spectrophotometric technique. Quantitative measurements of color retention versus time and temperature can be conducted by using a spectrometer made by Perkin Elmer, UV/VIS Lambda 950. Samples of liquid colored materials are placed in a glass cuvette. An empty, blank cuvette is also placed in the reference chamber to cancel out the effect of the glass in the % transmission measurements. At this point % light transmission of the colored solution is measured using wavelengths from 300 nm to 800 nm. Color coordinates are calculated from these transmission spectra using ASTM method E 308-01. The spectral tristimulus values used in these calculations are the CIE 1964) (10° observer values. The illuminant used is a D65 illuminant, and the color values are computed in the L*a*b* color scale against a standard D65 illuminant light % transmission vs wavelength spectra which represents essentially natural daylight. CIE Standard Illuminant D65 is a commonly used standard illuminant defined by the International Commission on Illumination. D65 corresponds roughly to a midday sun in Western Europe/Northern Europe, hence it is also called a natural daylight illuminant. The resulting raw data values of % transmission values versus wavelength in nanometers (nm) are then used to calculate the CIELAB 1976 color space parameters of L*, a* and b* and/or $\Delta E$. It is also possible to simply plot the % transmission values versus wavelength. Liquid chromatography or titration could also be used to monitor the peroxide or active oxygen levels in the solutions over time.

Embodiments of Breaker Compositions

After the viscosity of an aqueous treatment fluid has been maintained at a relatively high level for a certain period of time in order to carry out the desired amount of fracturing in a subterranean formation and/or to deposit proppant in the fractures, the breaker composition "breaks" the aqueous treatment fluid, e.g., by degrading the polymer (or "gelling agent") in the fracturing fluid, preferably at a breaking temperature of 90-300° F. According to particular embodiments, incorporation of the dye into the aqueous treatment fluid shortens the amount of time that it takes the peroxide to degrade the polymer. According to additional embodiments, incorporation of the dye into the aqueous treatment fluid reduces the peak viscosity of the aqueous treatment fluid before the peroxide degrades the polymer. The dye also enables the user to visibly ascertain the identity of the breaker composition.

An additional unexpected advantage of the breaker compositions of the present invention is that they may prevent rehealing of the aqueous treatment fluid after the temperature is reduced (e.g., to room temperature). According to preferred embodiments, after the temperature of the aqueous treatment fluid is reduced to a temperature below the breaking temperature (e.g., after the temperature is reduced by 10° F., or 20° F., or 30° F., or 40° F., or 50° F., or 60° F., or 70° F., or 80° F., or 90° F., or 100° F., or 110° F., or 120° F., or 130° F., or 140° F., or 150° F., or 160° F., or 170° F., or 180° F., or 190° F., or 200° F., or more, below the breaking temperature), the breaker compositions of the present invention are able to maintain the reduced viscosity of the "broken" aqueous treatment fluid for a period of time, such that no rehealing is observed, or only partial rehealing is observed.

As used herein, an "amount of rehealing" refers to the percentage of the pre-break viscosity that the aqueous treatment recovers after it has been broken and the temperature has been reduced to below the breaking temperature (e.g., after the temperature has been reduced to room temperature). According to particular embodiments, the breaker composition causes the aqueous treatment fluid to maintain the same "post-break" viscosity of about 0.2 cP to about 10 cP for a period of time at room temperature (e.g., for at least 10 minutes, at least 30 minutes, at least one hour, at least three hours, at least six hours, at least twelve hours, or at least 24 hours). This means that the breaker composition may completely prevent any rehealing from occurring such that no re-healing is observed for this period of time. According to other embodiments, the breaker composition substantially prevents rehealing of the aqueous treatment fluid (i.e., only "partial rehealing" is observed), which means the amount of rehealing observed in the aqueous treatment fluid is about 0.1% to about 60%, or about 0.1% to about 50%, or about 0.1% to about 40%, about 0.1% to about 30%, about 0.1% to about 20%, or about 0.1% to about 15%, or about 0.1% to about 10%, or about 0.1% to about 5%, or about 0.1% to about 1%.

The concentration of peroxide(s) in the breaker composition may be selected and controlled so as to impart the desired "break" characteristics and profile for a particular downhole fracturing operation or situation. In particular, the peroxide is present in an amount effective to reduce the viscosity of the aqueous treatment fluid when it has a "breaking temperature" of between 90° F. to 300° F. The aqueous treatment fluids may be formulated such that a break in the viscosity of the aqueous treatment fluid is exhibited within the "breaking temperature" range of from about 90° F. to about 300° F., or from about 100° F. to about 280° F., or from about 170° F. to about 230° F., or from about 180° F. to about 250° F., or from about 200° F. to about 240° F. in various embodiments of the invention. According to particular embodiments, the aqueous treatment fluid has a ("pre-break") viscosity in the range of about 1,000 centipoise (cP) to about 3,500 cP prior to being broken by the breaker composition. Breaking occurs at a "breaking temperature" in the range of 90-300° F. (e.g., in the range of 100-280° F., or 170-230° C., or 180-250° F., or 200-240° F.). Breaking results in a reduced "post-break" viscosity of the aqueous treatment fluid of about zero cP to about 250 cP, or about 0.1 cP to about 250 cP, or zero cP to about 125 cP, or about 0.1 cp to about 125 cP, or zero cP to about 75 cP, or about 0.1 cP to about 75 cP, or zero cP to about 10 cP, or about 0.1 cP to about 10 cP, or about 0.2 cP to about 10 cP at 40 $sec^{-1}$ (constant shear rate) after the breaker composition has caused the aqueous treatment fluid to have a reduction in viscosity. Viscosity is preferably determined in accordance with API RP 39 ("Recommended Practices on Measuring the Viscous Properties of a Cross-Linked Water-Based Fracturing Fluid," API Recommended Practice 39, $3^{rd}$ Edition, May 1998), which is incorporated by reference herein.

The peroxide(s) in the breaker composition may include any peroxide effective for reducing the viscosity of the aqueous treatment fluid. The peroxide(s) may be a hydrogen peroxide, or an inorganic peroxide, or an organic peroxide, or a blend thereof. In one aspect of the invention, the peroxide is a room temperature stable organic peroxide (i.e., an organic peroxide which does not exhibit significant degradation or decomposition when stored at 25° C. in the absence of substances other than inert solvents). In another aspect, the peroxide is water soluble. The peroxide may have a water solubility greater than 1 g/100 g water at room temperature and pressure. For example, the peroxide may have a water solubility between 3 g/100 g water and 18 g/100 g water, or between 5 g/100 g water and 18 g/100 g water, or between 5 g/100 g water and 10 g/100 g water, or between 3 g/100 g water and 10 g/100 g water, or between 3 g/100 g water and 5 g/100 g water, at room temperature and pressure. The solubility can be measured by using an iodometric titration such as that described by Arthur Vogel in Vogel's Textbook of Quantitative Chemical Analysis, 5th ed., § 10.110, 384-87, Longman Scientific & Technical 1989. The peroxide may be both water soluble and stable at room temperature.

According to particular embodiments, the breaker composition includes between 0.1 to 98%, preferably 0.1 to 20%, more preferably between 0.1 to 15%, and even more preferably 1% and 10% peroxide in water. For example, the breaker composition may include between 2% and 10% peroxide, or between 2% and 8% peroxide, or between 3% and 8% peroxide, or between 4% and 8% peroxide, or between 4% and 7% peroxide, or about 5% peroxide in water.

Suitable peroxides include, for example, diacyl peroxides, peroxyesters, monoperoxycarbonates, peroxyketals, hydroperoxides (including alkyl hydroperoxides and aryl hydroperoxides), peroxydicarbonates, ketone peroxides, endoperoxides, and dialkyl peroxides. Combinations of different peroxides, including combinations of different organic peroxides, may be utilized.

Suitable peroxyesters may include, without limitation: di-tert-butyl diperoxyphthalate; di-tert-amyl diperoxyphthalate; tert-butyl peroxybenzoate; tert-amyl peroxybenzoate; tert-butyl peroxyacetate; tert-amyl peroxyacetate; 2,5-di (benzoylperoxy)-2,5-dimethylhexane; tert-butyl peroxymaleate; tert-amyl peroxymaleate; tert-butyl peroxy-2-ethylhexanoate; tert-butyl peroxyisobutyrate; tert-amyl peroxyisobutyrate; di(tert-butylperoxy)fumarate; tert-butyl peroxy(2-ethylbutyrate); tert-butyl peroxy-2-ethylhexanoate; tert-amyl peroxy-2-ethylhexanoate; 2,5-di(2-ethylhexanoylperoxy)-2,5-dimethylhexane; t-butyl peroxy 3,5,5-trimethylhexanoate; t-amyl peroxy 3,5,5-trimethylhexanoate; 1,1-dimethyl-3-hydroxy-butylperoxy-2-ethylhexanoate; tert-butylperoxy-3-carboxypropionate; tert-amylperoxy-3-carboxypropionate; 3-hydroxy-1,1-dimethylbutyl 2-ethyl-peroxyhexanoate; and combinations thereof.

Suitable monoperoxycarbonates may include, for example: OO-tert-butyl-O-(isopropyl) monoperoxycarbonate; OO-tert-amyl-O-(isopropyl)monoperoxycarbonate; OO-tert-butyl-O-(2-ethylhexyl)monoperoxycarbonate; OO-tert-amyl-O-(2-ethylhexyl)monoperoxycarbonate; polyether poly(OO-tert-butyl monoperoxycarbonate); OO-t-butyl-O-polycaprolactone monoperoxy carbonate; 2,5-dimethyl-2,5-bis(isopropoxycarbonyl-peroxy)hexane; 2,5-dimethyl-2,5-bis(isopropoxycarbonyl-peroxy)hexyne-3; and combinations thereof.

Suitable peroxyketals may include, for example: 1,1-di (tert-butylperoxy)-3,3,5-trimethylcyclohexane; 1-tert-amylperoxy-1-methoxy cyclohexane; 1-tert-butylperoxy-1-methoxy cyclohexane; 1,1-di(tert-butylperoxy)cyclohexane; 1,1-di(tert-amylperoxy)cyclohexane; n-butyl-4,4-di(tert-butylperoxy)valerate; 4,4-bis(tert-butylperoxy)valeric acid; ethyl-3,3-di(tert-amylperoxy)butanoate; ethyl-3,3-di(tert-butylperoxy)butanoate; ethyl-3,3-di(tert-butylperoxy)butyrate; 2,2-di(tert-butylperoxy)butane; 2,2-di(tert-amylperoxy)butane; 2,2-di(tert-butylperoxy)propane; 2,2-di(tert-amylperoxy)propane; 2,2-di(tert-butylperoxy)4-methylpentane; 2,2-bis(4,4-di[tert-amylperoxy]cyclohexyl) propane; and combinations thereof.

Suitable diacyl peroxides may include, for example: didecanoyl peroxide; dilauroyl peroxide; dibenzoyl peroxide; di(methyl benzoyl)peroxide; 2,4-dichlorobenzoyl peroxide; and combinations thereof.

Suitable ketone peroxides may include, for example: 2,4-pentanedione peroxide; methyl ethyl ketone peroxide; methyl isobutyl ketone peroxide; and mixtures thereof.

Suitable hydroperoxides may include, for example: 2,5-dihydroperoxy-2,5-dimethylhexane; cumene hydroperoxide; t-butyl hydroperoxide; t-amyl hydroperoxide; t-octyl hydroperoxide; hydrogen peroxide ($H_2O_2$); 1,1,3,3-tetramethylbutyl hydroperoxide; para-methane hydroperoxide; diisopropylbenzene monohydroperoxide; diisopropylbenzene dihydroperoxide; and combinations thereof.

Suitable peroxydicarbonates may include, for example: di(4-tert-butylcyclohexyl)peroxydicarbonate; di(cyclohexyl)peroxydicarbonate; di(2-phenoxyethyl)peroxydicarbonate; dimyristyl peroxydicarbonate; dicetyl peroxydicarbonate; and combinations thereof.

Suitable dialkyl peroxides may include, for example: dicumyl peroxide; isopropenylcumyl cumyl peroxide; isopropylcumyl cumyl peroxide; m/p-di-tert-butylperoxydiisopropylbenzene (a,a'-bis(tert-butylperoxy)diisopropylbenzene); tert-butylperoxyisopropylbenzene (tert-butyl cumyl peroxide); m-isopropylolcumyl t-butyl peroxide (tert-butyl 3-isopropylolcumylperoxide); tert-butyl-3-isopropenylcumyl peroxide (m-isopropenylcumyl tert-butyl peroxide); tert-butyl-4-isopropenylcumyl peroxide; tert-butyl-3-isopropylcumyl peroxide; m/p-acetylcumyl t-butyl peroxide; 2,4-diallyloxy-6-tert-butylperoxide-1,3,5-triazine; 3,3,5,7,7-pentamethyl-1,2,4-trioxepane (e.g., TRIGONOX® 311); 3,6,9-triethyl-3,6,9-trimethyl-1,4,7-triperoxonane (e.g., TRIGONOX® 301); di-tert-butyl peroxide; 2-methoxy-2-tert-butylperoxy propane; di-tert-amyl peroxide; 2,5-dimethyl-2,5-di(tert-butylperoxy)hexane; 2,5-dimethyl-2,5-di (tert-amylperoxy)hexane; 2,5-dimethyl-2,5-di(tert-butylperoxy)hexyne-3; 1,3-dimethyl-3(t-butylperoxy)butyl N[1-{3-(1-methylethenyl)phenyl}1-methylethyl]carbamate; 4-(tert-amylperoxy)-4-methyl-2-pentanol; 4-(tert-butylperoxy)-4-methyl-2-pentanol; 3-(t-butylperoxy)-3-methyl-2-pentanone; 4-methyl-4-(tert-butylperoxy)-2-pentanone (e.g., LUPEROX® 120); 1-methoxy-1-tert-butylperoxy cyclohexane; 2,4,6-tri(tert-butylperoxy)triazine; tert-butyl-1,1,3,3-tetramethylbutyl peroxide; 3-methyl-3-(tert-butylperoxy)-2-butanol (e.g., LUPEROX® 240); 3-methyl-3(tert-amylperoxy)-2-butanol (e.g., LUPEROX® 540); and combinations thereof.

According to particular embodiments, the peroxide in the breaker composition of the present invention comprises, consists essentially of, or consists of tert-butyl hydroperoxide. According to these embodiments, the breaker composition may comprise, consist essentially of, or consist of water and tert-butyl hydroperoxide.

In some preferred embodiments, the at least one organic peroxide is selected from the group considering of 2,5-dimethyl-2,5-di(t-butylperoxy)hexane; cumene hydroperoxide; 1,1-di(t-butylperoxy)-3,3,5-trimethylcyclohexane; diisopropylbenzene hydroperoxide; di-t-butyl peroxide; di-t-amyl peroxide; 2,5-dimethyl-2,5-di(t-butylperoxy)hexyne-3; t-butyl cumyl peroxide; t-butyl perbenzoate; and OO-(t-butyl)-O-(2-ethylhexyl)monoperoxycarbonate, and mixtures thereof.

The dye(s) that are included in the breaker compositions of the present invention are preferably organic, and are also preferably metal-free (e.g., they do not include iron). For example, the dyes preferably do not include any of the dyes listed in U.S. Pat. No. 3,181,991 (e.g., red iron oxide, black iron oxide, yellow iron oxide, chrome orange, phthalocyanine and ferric ferrocyanide). The dyes also preferably do not include anthraquinone derivatives or pyrazalone derivatives.

According to particular embodiments, the dyes are D&C dyes (dyes that have been approved by the U.S. Food and Drug Administration for use in drugs and cosmetics), more preferably FD&C dyes (dyes that have been approved by the U.S. Food and Drug Administration for use in food, drugs and cosmetics).

Non-limiting examples of suitable dyes that may be used in breaker compositions of the present invention include FD&C Blue #1, FD&C Red #3, FD&C Red #40, FD&C Yellow #6, Purple Shade, Grape Shade, Blue Liquid and Purple Liquid. The dyes are commercially available; for example, from ROHA or Abbey Color.

As used herein, FD&C Blue #1 is ethyl-[4-[[4-[ethyl-[(3-sulfophenyl)methyl]amino]phenyl]-(2-sulfophenyl)methylidene]-1-cyclohexa-2,5-dienylidene]-[(3-sulfophenyl)methyl]azanium, as shown below:

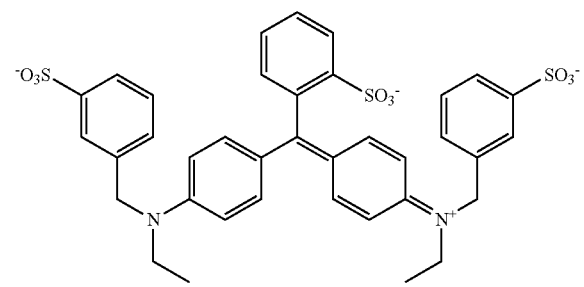

FD&C Blue #1 is also known in the art as "Brilliant Blue FCF," and is preferably in powder form.

As used herein, FD&C Red #3 is 2-(6-hydroxy-2,4,5,7-tetraiodo-3-oxo-xanthen-9-yl)benzoic acid, as shown below:

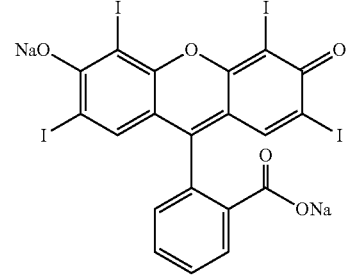

FD&C Red #3 is also known in the art as "erythrosine," and is preferably in powder form.

As used herein, FD&C Red #40 is disodium 6-hydroxy-5-((2-methoxy-5-methyl-4-sulfophenyl)azo)-2-napthalenesulfonate, as shown below:

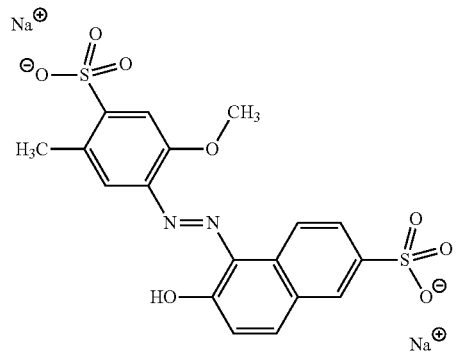 [SMILES: [Na+] ; COc1cc(S(=O)(=O)[O-])c(C)cc1/N=N/c1c(O)ccc2cc(S(=O)(=O)[O-])ccc12 ; [Na+]]

FD&C Red #40 is also known in the art as "Allura Red," and is preferably in powder form.

As used herein, FD&C Yellow #6 is disodium 6-hydroxy-5-[(4-sulfophenyl)azo]-2-naphthalenesulfonate, as shown below:

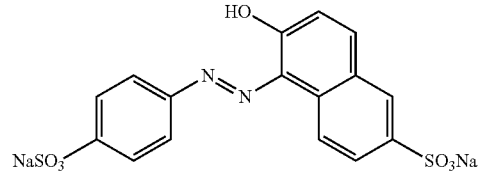

FD&C Yellow #6 is also known in the art as "Sunset Yellow," and is preferably in powder form.

According to particular embodiments, the dye(s) included in breaker compositions of the present invention are selected from the group consisting of FD&C Blue #1, FD&C Red #3, FD&C Red #40, FD&C Yellow #6 and mixtures thereof. According to particular embodiments, the dye(s) included in breaker compositions of the present invention optionally include one or more preservatives (e.g., sodium benzoate and/or citric acid).

As used herein, "Purple Shade" comprises, consists essentially of, or consists of both FD&C Blue #1 and FD&C Red #3. "Purple Shade" is preferably in powder form.

"Grape Shade" comprises, consists essentially of, or consists of both FD&C Blue #1 and FD&C Red #40 (for example, about 75 wt % Red #40 and about 25 wt % Blue #1). "Grape Shade" is preferably in powder form.

"Blue Liquid" comprises, consists essentially of, or consists of FD&C Blue #1 and at least one preservative (e.g., sodium benzoate and/or citric acid) in water. According to particular embodiments, "Blue Liquid" comprises, consists essentially of, or consists of FD&C Blue #1, sodium benzoate and citric acid in water.

"Purple Liquid" comprises, consists essentially of, or consists of FD&C Blue #1, FD&C Red #40 and at least one preservative (e.g., sodium benzoate and/or citric acid) in water. According to particular embodiments, "Purple Liquid" comprises, consists essentially of, or consists of FD&C Blue #1, FD&C Red #40, sodium benzoate and citric acid in water.

According to particular embodiments, the dye(s) in the breaker composition comprise, consist essentially of, or consist of the dyes selected from the group consisting of FD&C Blue #1, FD&C Red #40, and a combination thereof.

According to particular embodiments, the dye(s) contain one or more sulfonate functional groups, wherein the sulfonate functional group(s) may be attached to an aromatic ring.

According to alternative embodiments, the dye(s) are water-soluble anionic dyes.

According to particular embodiments, the breaker composition includes the at least one dye in an amount between about 0.001 wt % and about 2 wt %, or between about 0.005 wt % and about 2 wt %, or between about 0.01 wt % and about 2 wt %, or between about 0.1 wt % and about 2 wt %, or between about 0.5 wt % and about 2 wt %, or between about 0.005 wt % and about 1 wt %, or between about 0.01 wt % and about 1 wt %, or between about 0.1 wt % and about 1 wt %, or between about 0.5 wt % and about 1 wt %.

Suitable alcohols for use in the breaker compositions of the present invention may include, for example, glycols and/or butyl alcohols and/or triols (e.g., glycerol) and/or monosaccharides and/or disaccharides. In one aspect of the invention, the alcohol is water soluble. The alcohol may be a mono-alcohol (containing one hydroxyl group per molecule) and/or a triol (e.g., glycerol) and/or a polyalcohol (containing two or more hydroxyl groups per molecule), such as a glycol. According to particular embodiments, the breaker composition does not include ethylene glycol.

According to particular embodiments, the breaker composition includes between 0.01% and 40% alcohol(s), or between 0.01% and 30% alcohol(s), or between 0.1% and 15% alcohol(s), or between 0.01% and 5% alcohol(s), or between 0.1% and 5% alcohol(s), or between 0.1% and 3% alcohol(s), or between 0.5% and 5% alcohol(s), or between 0.5% and 3% alcohol(s), or between 0.5% and 2% alcohol(s), or between 0.5% and 1.5% alcohol(s), or between 0.5% and 1% alcohol(s), or about 1% alcohol(s), or about 0.95% alcohol(s) in water. According to further embodiments, the breaker composition includes between 5% and 30% alcohol(s) relative to the peroxide(s), or between 10% and 30%, or between 10% and 25%, or between 15% and 25%, or between 15% and 20%, or between 20% and 30%, or between 20% and 25% relative to the peroxide(s).

According to particular embodiments, the alcohol(s) included in the breaker composition are selected from the group consisting of glycols, butyl alcohols, triols, monosaccharides, disaccharides and a combination thereof. Alternatively, the alcohol(s) comprise, consist essentially of, or consist of propylene glycol and/or butyl alcohol(s) (e.g., t-butyl alcohol). According to these embodiments, the breaker composition may comprise, consist essentially of, or consist of water; at least one peroxide (e.g., tert-butyl hydroperoxide); and at least one alcohol selected from the group consisting of propylene glycol, a butyl alcohol (e.g., tert-butyl alcohol), and a combination thereof.

According to particular embodiments, the breaker composition comprises, consists essentially of, or consists of:
water (e.g., in an amount of about 85% to about 98%, about 88% to about 95% or about 92% to about 96%),
at least one peroxide (e.g., in an amount of about 1% to about 10%),
at least one alcohol (e.g., in an amount of about 0.01 to about 5%), and
at least one dye (e.g., in an amount about 0.001 wt % and about 2 wt %).

According to particular embodiments, the breaker composition is not in the form of an oil-in-water or water-in-oil emulsion, i.e., the breaker composition is in a non-emulsified form. For example, in certain embodiments the breaker composition is not a microemulsion or nanoemulsion.

Another aspect of the present invention relates to an aqueous treatment fluid that has been combined with a breaker composition. According to particular embodiments, the aqueous treatment fluid comprises, consists essentially of, or consists of:
water;
a gelling agent;
a crosslinking agent; and
any embodiment of the breaker compositions described herein, e.g., a breaker composition that comprises, consists essentially of, or consists of at least one organic peroxide, at least one dye, and at least one alcohol. According to particular embodiments, the breaker composition reduces the "break time" and/or the peak viscosity of the aqueous treatment fluid in comparison to a breaker composition that does not include any dyes.

In various embodiments of the invention, the breaker composition is included in the aqueous treatment fluid in an amount of about 0.05 GPT (Gallons Per Thousand) to about 10 GPT peroxide, about 0.1 GPT to about 5 GPT peroxide, or about 0.2 GPT to about 2 GPT peroxide, or about 1.0 GPT peroxide.

The aqueous treatment fluid includes at least one gelling agent, i.e., a polymer capable of functioning as a viscosifying agent to thicken the aqueous treatment fluid. Suitable gelling agents generally are of high molecular weight and increase the viscosity of the aqueous treatment fluid to facilitate formation of the fractures and transport of the proppant into the fractures. The concentration of gelling agent(s) in the aqueous treatment fluid may be selected and controlled so as to impart to the fluid the viscosity and other rheological characteristics desired or needed for a particular end-use application. In various embodiments of the invention, for example, the gelling agent(s) are included in the aqueous treatment fluid in an amount of about 5 GPT to about 15 GPT gelling agent(s), or about 6 GPT to about 14 GPT gelling agent(s), or about 8 GPT to about 12 GPT gelling agent(s), or about 10 GPT gelling agent(s).

Suitable gelling agents include hydratable polysaccharides, polyacrylamides, polyacrylamide copolymers, polylactic acid, and polyvinyl alcohol. Hydratable polysaccharides may include galactomannan gums and derivatives thereof, glucomannan gums and derivatives thereof, and cellulose derivatives. Examples of such compounds are guar gum, locust bean gum, karaya gum, sodium carboxymethylguar, hydroxyethylguar, sodium carboxymethylhydroxyethylguar, hydroxypropylguar, sodium carboxymethylhydroxymethylcellulose, sodium carboxymethylhydroxyethylcellulose, carboxymethylguar (CMG), carboxymethylhydroxypropylguar (CMHPG), and hydroxyethylcellulose.

In one embodiment, the gelling agent is selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride methyl vinyl ether copolymers, and polyethylene oxides. In an exemplary embodiment of the present invention, the gelling agent in the aqueous treatment fluid may include functionalized guar derivatives, guar gum, and combinations thereof. Any suitable gelling agent may be used, whether water soluble or insoluble. In an exemplary embodiment, however, the gelling agent is water soluble or water swellable. A single gelling agent may be used or a combination of gelling agents may be used in the aqueous treatment fluid. For example, the guar type (water soluble) and polyacrylamide type (water resistant) polymers may be used in combination. Any suitable ratio of polymers may be used to achieve the desired viscosity.

Crosslinking agents or other additives may also be included in the aqueous treatment fluid to increase the viscosity. Crosslinking agents useful for increasing the viscosity of gelling agents utilized in fracturing fluids are well known in the art (e.g., borate, zirconium, aluminum, titanium, and chromium organometallic crosslinkers). In one embodiment of the invention, the gelling agent is a polysaccharide crosslinked with at least one crosslinker selected from the group consisting of borate, zirconium, aluminum, titanium, and chromium organometallic crosslinkers. For example, a guar or derivatized guar polymer may be crosslinked with either borates (boric acid) or zirconium compounds or both. The crosslinking agent may or may not possess time-delayed crosslinking capabilities. For example, the crosslinking agent may be a latent crosslinking agent which is only activated when exposed to certain conditions, e.g., an elevated temperature. Preferred crosslinking agents include borate and zirconate crosslinkers. In various embodiments of the invention, the crosslinking agent is included in the aqueous treatment fluid in an amount of about 0.5 GPT to about 10 GPT gelling agent, or about 1 GPT to about 8 GPT gelling agent, or about 1 GPT to about 5 GPT gelling agent, or about 2 GPT to about 4 GPT gelling agent, or about 3 GPT gelling agent.

According to particular embodiments, the aqueous treatment fluid also includes at least one pH adjuster, such as one or more acids, bases, buffers, etc. According to particular embodiments, the pH adjuster comprises, consists essentially of, or consists of sodium hydroxide (e.g., 25% NaOH in water). According to additional embodiments, the pH adjuster(s) include a high pH buffer (e.g., a buffer having a pH greater than 7). The pH adjuster(s) are preferably included in an amount effective to achieve a pH of the aqueous treatment fluid, prior to the addition of a crosslinking agent, that is greater than 7 and less than 13, more preferably about 9 to about 12, even more preferably about 9.5 to about 11 (e.g., when the aqueous treatment fluid includes water, guar viscosifying polymer, and a borate crosslinker, as described in Example 1 below). According to alternative embodiments, the pH of the aqueous treatment fluid prior to the addition of a crosslinking agent is between about 4 and about 5 (e.g., when the aqueous treatment fluid includes water, carboxymethylhydroxypropyl guar, and a zirconium crosslinker). For example, the pH adjuster may be included in the aqueous treatment fluid in an amount of about 0.05 GPT to about 10 GPT, about 0.1 GPT to about 5 GPT, or about 0.2 GPT to about 2 GPT, or about 1 GPT to about 2 GPT, or about 1.5 GPT.

The aqueous treatment fluid may include one or more proppants. The proppants or propping agents are carried by the aqueous treatment fluid and deposited in the cracks created by the hydraulic fracturing, so that they can keep the cracks propped open. The proppant remains in the produced fractures to prevent closure of the fractures and to form a channel extending from the wellbore into the formation once the fracturing fluid is recovered. Any suitable proppant(s), such as sand, a synthetic ceramic proppant, or a resin/polymer coated proppant, may be used, as is well known in the art.

The aqueous treatment fluid may include one or more "promoters" as described herein (e.g., sodium thiosulfate) to promote or accelerate the degradation of the gelling agent. Typically, the aqueous treatment fluid will be formulated to contain, in various embodiments of the invention, from about 0.001% to about 10%, about 0.002% to about 5%, about 0.005% to about 2.5%, or about 0.01% to about 1.5% of total promoter. Alternatively, the aqueous treatment fluid may contain about 0.1 GPT to about 8 GPT, or about 1 GPT to about 6 GPT, or about 2 GPT to about 5 GPT promoter.

Another aspect of the present invention relates to a method for reducing the break time of an aqueous treatment fluid, said method comprising, consisting essentially of, or consisting of combining a breaker composition of the present invention (and optionally a promoter composition of the present invention) with the aqueous treatment fluid. The breaker composition preferably reduces the viscosity of the aqueous treatment fluid at a temperature of 90-300° F. (e.g., 100° F. to 280° F. or 180° F. to 250° F.). Any embodiments of the breaker composition and aqueous treatment fluid described herein may be used in accordance with this method (e.g., an aqueous treatment fluid comprising a gelling agent and a crosslinking agent, and a breaking composition comprising, consisting essentially of, or consisting of at least one organic peroxide, at least one alcohol, and at least one dye).

According to particular embodiments, the breaker composition completely prevents any rehealing from occurring and no re-healing is observed for the period of time. According to other embodiments, the breaker composition substantially prevents rehealing of the aqueous treatment fluid (i.e., the amount of rehealing observed in the aqueous treatment fluid is about 0.1% to about 20%, or about 0.1% to about 15%, or about 0.1% to about 10%, or about 0.1% to about 5%, or about 0.1% to about 1%).

Embodiments of Promoter Compositions

Another embodiment of the present invention relates to a promoter composition for use in an aqueous treatment fluid, the promoter composition comprising at least one promoter, and at least one dye.

Suitable promoters may include any salt of a thiosulfate, wherein thiosulfate corresponds to the anionic chemical species $S_2O_3^{2-}$. Suitable promoters also include any salt of a sulfite, wherein sulfite corresponds to the anionic chemical species $SO_3^{2-}$, as well as any salt of a bisulfite, wherein bisulfite corresponds to the anionic chemical species $HSO_3^-$. Salts of erythorbic acid are also suitable for use as the promoter. Combinations of different types of such promoters may also be utilized. In one aspect of the invention, the promoter is water-soluble. The cation(s) associated with the anion of the promoter may, for example, be ammonium, alkali metal cations such as sodium or potassium cations, alkaline earth metal cations such as calcium cation, metal cations such as silver, iron, copper, cobalt, manganese, vanadium and the like and combinations thereof. Illustrative examples of specific thiosulfate salts useful in the present invention include, but are not limited to, sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, and combinations thereof. Sodium sulfite, sodium bisulfite and sodium erythorbate are also suitable for use as promoters in the present invention. Sodium thiosulfate is preferred. The promoter may, for example, be incorporated into the aqueous treatment fluid as a conventional solid salt, as a polymer-encapsulated/coated (time-release) solid salt or as a concentrated aqueous salt solution.

The concentration of promoter such as thiosulfate salt in the aqueous treatment fluid may be selected and controlled so as to achieve the desired level of promotion with respect to the peroxide. In one aspect of the invention, an amount of promoter such as thiosulfate salt is present in the aqueous treatment fluid which is effective to lower the break temperature of the aqueous treatment fluid as compared to the break temperature exhibited by the aqueous treatment fluid in the absence of such promoter. The incorporation of one or more promoters in an aqueous treatment fluid in accordance with the present invention thus may effectively extend or expand the useful working temperature range of a breaker composition. In another aspect of the invention, an amount of promoter such as thiosulfate salt is present in the aqueous treatment fluid which is effective to reduce the break time of the aqueous treatment fluid as compared to the break time exhibited by the aqueous treatment fluid in the absence of such promoter.

According to particular embodiments, the at least one promoter is included in the promoter composition in an amount between about 0.5 wt % and about 40 wt %, or between about 2 wt % and about 35 wt %, or between about 5 wt % and about 35 wt %, or between about 10 wt % and about 30 wt %.

The dye(s) that are included in the promoter compositions of the present invention are preferably organic, and are also preferably metal-free (e.g., they do not include iron). For example, the dyes preferably do not include any of the dyes listed in U.S. Pat. No. 3,181,991 (e.g., red iron oxide, black iron oxide, yellow iron oxide, chrome orange, phthalocyanine and ferric ferrocyanide). The dyes also preferably do not include anthraquinone derivatives or pyrazalone derivatives.

According to particular embodiments, the dyes are D&C dyes (dyes that have been approved by the U.S. Food and Drug Administration for use in drugs and cosmetics), more preferably FD&C dyes (dyes that have been approved by the U.S. Food and Drug Administration for use in food, drugs and cosmetics).

Non-limiting examples of suitable dyes that may be used in promoter compositions of the present invention include FD&C Blue #1, FD&C Red #3, FD&C Red #40, FD&C Yellow #6, Purple Shade, Grape Shade, Blue Liquid and Purple Liquid. The dyes are commercially available; for example, from ROHA or Abbey Color.

According to particular embodiments, the dye(s) included in promoter compositions of the present invention are selected from the group consisting FD&C Blue #1, FD&C Red #3, FD&C Red #40, FD&C Yellow #6 and mixtures thereof. According to particular embodiments, the dye(s) included in promoter compositions of the present invention optionally include one or more preservatives (e.g., sodium benzoate and/or citric acid).

According to particular embodiments, the dye(s) in the promoter composition comprise, consist essentially of, or consist of the dyes selected from the group consisting of FD&C Blue #1, FD&C Red #40, and a combination thereof.

According to particular embodiments, the dye(s) contain one or more sulfonate functional groups, wherein the sulfonate functional group(s) may be attached to an aromatic ring.

According to alternative embodiments, the dye(s) are water-soluble anionic dyes.

According to particular embodiments, the promoter composition includes the at least one dye in an amount between about 0.001 wt % and about 2 wt %, or between about 0.005 wt % and about 2 wt %, or between about 0.01 wt % and about 2 wt %, or between about 0.1 wt % and about 2 wt %, or between about 0.5 wt % and about 2 wt %, or between about 0.005 wt % and about 1 wt %, or between about 0.01 wt % and about 1 wt %, or between about 0.1 wt % and about 1 wt %, or between about 0.5 wt % and about 1 wt %.

The promoter composition may optionally include at least one alcohol. Suitable alcohols for use in the promoter compositions of the present invention may include, for example, glycols and/or butyl alcohols and/or triols (e.g., glycerol) and/or monosaccharides and/or disaccharides. In one aspect of the invention, the alcohol is water soluble. The alcohol may be a mono-alcohol (containing one hydroxyl group per molecule) and/or a triol (e.g., glycerol) and/or a polyalcohol (containing two or more hydroxyl groups per molecule), such as a glycol. According to particular embodiments, the breaker composition does not include ethylene glycol.

According to particular embodiments, the promoter composition includes between 0.01% and 5% alcohol(s), or between 0.1% and 5% alcohol(s), or between 0.1% and 3% alcohol(s), or between 0.5% and 5% alcohol(s), or between 0.5% and 3% alcohol(s), or between 0.5% and 2% alcohol(s), or between 0.5% and 1.5% alcohol(s), or between 0.5% and 1% alcohol(s), or about 1% alcohol(s), or about 0.95% alcohol(s) in water.

According to particular embodiments, the promoter composition comprises, consists essentially of, or consists of:
water (e.g., in an amount of about 60% to about 99%, 85% to about 98%, about 88% to about 95% or about 92% to about 96%),
at least one promoter (e.g., in an amount of about 0.5 wt % to about 40 wt %),
at least one dye (e.g., in an amount about 0.001 wt % and about 2 wt %), and
at least one optional alcohol (e.g., in an amount of about 0.01 wt % to about 30 wt %).

According to particular embodiments, a promoter composition of the present invention is combined with a breaker composition in order to promote or accelerate the degradation of the gelling agent in the aqueous treatment fluid. Either one or both of the breaker composition and promoter composition include at least one dye. Without being bound by any theory, it is believed that the dye increases the efficiency of the promoter, so that when the promoter composition is combined with the breaker composition, the "break time" and/or the peak viscosity of the aqueous treatment fluid are reduced.

According to particular embodiments, an aqueous treatment fluid comprises, consists essentially of, or consists of:

water;
at least one gelling agent;
at least one crosslinking agent;
a breaker composition comprising, consisting essentially of, or consisting of at least one organic peroxide, optionally at least one dye, and optionally at least one alcohol; and
a promoter composition comprising, consisting essentially of, or consisting of at least one promoter, at least one dye and at least one optional alcohol.

Another aspect of the present invention relates to a method for fracturing a subterranean formation comprising, consisting essentially of, or consisting of:
injecting into the subterranean formation under fracturing conditions, an aqueous treatment fluid, a breaker composition, and an optional promoter composition,
wherein the aqueous treatment fluid comprises a gelling agent and a crosslinking agent,
wherein the breaker composition comprises, consists essentially of, or consists of at least one peroxide, at least one dye, and at least one alcohol, and
wherein the optional promoter composition comprises, consists essentially of, or consists of at least one promoter, at least one optional dye and at least one optional alcohol.

Another aspect of the present invention relates to a method for fracturing a subterranean formation comprising, consisting essentially of, or consisting of:
injecting into the subterranean formation under fracturing conditions an aqueous treatment fluid, a breaker composition, and a promoter composition,
wherein the aqueous treatment fluid comprises a gelling agent and a crosslinking agent,
wherein the breaker composition comprises, consists essentially of, or consists of at least one peroxide, at least one optional dye, and at least one optional alcohol, and
wherein the optional promoter composition comprises, consists essentially of, or consists of at least one promoter, at least one optional dye and at least one optional alcohol.

The aqueous treatment fluid, breaker composition and promoter composition may be injected simultaneously (e.g., they are combined prior to injection), or separately (e.g., the aqueous treatment fluid is injected into the formation, followed by the breaker composition and promoter composition). The aqueous treatment fluid is supplied to a desired location in a subterranean formation and the aqueous treatment fluid is maintained with sufficient viscosity to form at least one fracture. The breaker composition is allowed to degrade the gelling agent and reduce the viscosity of the aqueous treatment fluid at a temperature of 90-300° F. (e.g., 100° F. to 280° F. or 180° F. to 250° F.). After the temperature is reduced (e.g., to room temperature), the breaker composition preferably enables the aqueous treatment fluid to maintain its reduced viscosity. Any embodiments of the breaker composition and aqueous treatment fluid described herein may be used in accordance with this method.

The embodiments described herein are intended to be exemplary of the invention and not limitations thereof. One skilled in the art will appreciate that modifications to the embodiments and examples of the present disclosure may be made without departing from the scope of the present disclosure.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention. Unless specified otherwise, all values provided herein include up to and including the starting points and end points given.

The following examples further illustrate embodiments of the invention and are to be construed as illustrative and not in limitation thereof.

EXAMPLES

Aqueous treatment fluids were prepared as described in Examples 1 and 2, below. Viscosity was measured in accordance with API RP 39 ("Recommended Practices on Measuring the Viscous Properties of a Cross-Linked Water-Based Fracturing Fluid," API Recommended Practice 39, $3^{rd}$ Edition, May 1998), except that the shear rate was 40 $s^{-1}$ and the volume of the fluid was 52 mL. Unless otherwise noted, viscosity vs. time experiments to assess break time were conducted at 190° F.

Example 1

500 mL of water was placed into a large wide mouth glass jar. The overhead stirrer was turned on and set at 730 RPM. 5.0 mL of guar viscosifier was added to 500 mls water. This is equal to 10 GPT (10 gallons of guar viscosifier fluid/one thousand gallons water). The viscosifying polymer slurry was added to the water and allowed to mix for 10 minutes. There is 4# of pure guar polymer per gallon of viscosifier fluid, so this is a 40#guar/M gallons water fluid. Note: M=thousand. Then 1.5GPT high pH buffer was added and the pH was brought up to 10.5 by the addition of 25% NaOH. This is the basic preparation of the 40# guar fluid, prior to adding the organic peroxide breaker or other additives, e.g. sodium thiosulfate, and borate crosslinkers. In this example, this solution is the "starting fluid". Once the various testing additives, e.g., breaker, thiosulfate, crosslinker additives are incorporated to the starting fluid, a portion of the final homogeneous fluid is added to a Grace 5600 rheometer and viscosity versus time curves are obtained at 190 F with a shear rate of 40 reciprocal seconds.

In Example #1, the performance of the uncolored (control) 30% sodium thiosulfate solution is compared to the colored solutions of the invention in regard to break time performance at 190 F.

The uncolored control example uses 1.0GPT of uncolored 30% sodium thiosulfate and 0.95% propylene glycol in water, added to the pH-adjusted polymer solution (the starting fluid described above). Then 3.0 GPT of a delayed borate crosslinker CL-610 was added and allowed to mix for 1 minute at 730 rpm. Then 1.0 GPT of uncolored 5 wt % t-butyl hydroperoxide in water was added and allowed to mix for 1 minute at 730 rpm. This final control solution was tested on the Grace. The resulting viscosity versus time plot is provided on in FIG. 1, FIG. 2 and FIG. 3 and was labeled as the "Uncolored Control".

Referring to FIG. 1; 1.0GPT of 30% sodium thiosulfate, 0.02% Grape Shade USDB06186 and 0.95% propylene glycol in water were added to the starting fluid. Then 3.0GPT of a delayed borate crosslinker CL-610 was added and allowed to mix for 1 minute. Then 1.0 GPT of uncolored 5 wt % t-butyl hydroperoxide in water was added and allowed to mix for 1 minute at 730 rpm. This final solution, referred to as "grape shade", was tested on the Grace 5600. Before use, the Grace 5600 co-cylindrical rheometer must be turned on and warmed up for 30 min. Then 52 mls of the fracture fluid is added to the Grace 5600 sample cup and the B5 bob is then lowered into the sample cup and the unit assembled as per the published manual. The Grace rheometer break tests were performed at 190 F and 400 psi with a shear rate of 40 s−1. The fluid viscosity versus time plot using the Grape Shade composition was compared to the "Uncolored Control" wherein both curves can be found in FIG. 1.

Unexpectedly it was found that the grape shade composition of the invention provided a more efficient (faster) break time at 190 F, versus the uncolored control formulation. The "Uncolored Control" provided a time to 10 cp viscosity of 72 minutes. In contrast, the grape shade composition provided a 10 cp fluid in only 36 minutes. See FIG. 1. Thus the grape shade composition of the invention provided a 50% improvement in break-time compared to the uncolored control.

Figure 2:
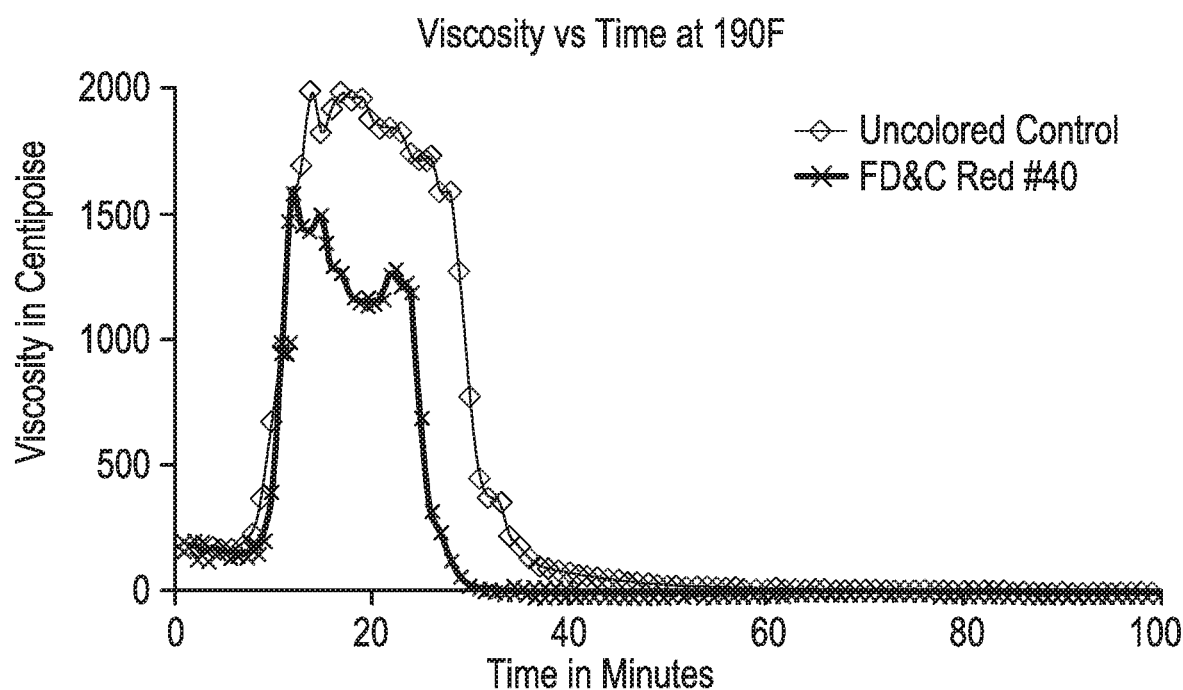

Referring to FIG. 2; 1.0GPT of 30% sodium thiosulfate, 0.04% FD&C Red #40 and 0.95% propylene glycol in water were added to the starting fluid. Then 3.0 GPT of a delayed borate crosslinker CL-610 was added and allowed to mix for 1 minute. Then 1.0 GPT of uncolored 5 wt % t-butyl hydroperoxide in water was added and allowed to mix for 1 minute at 730 rpm. This solution, referred to as "FD&C Red #40", was tested on the Grace 5600. Before use, the Grace 5600 co-cylindrical rheometer must be turned on and warmed up for 30 min. Then 52 mls of the fracture fluid is added to the Grace 5600 sample cup and the B5 bob is then lowered into the sample cup and the unit assembled as per the published manual. The Grace rheometer break tests were performed at 190 F and 400 psi with a shear rate of 40 s−1. The fluid viscosity versus time plot using the FD&C Red #40 composition was compared to the "Uncolored Control" wherein both curves can be found in FIG. 2.

Unexpectedly it was found that the FD&C Red #40 fluid composition of the invention provided a more efficient (faster) break time at 190 F, versus the uncolored control formulation. The "Uncolored Control" provided a time to 10 cp viscosity of 72 minutes. In contrast, the "FD&C Red #40" composition provided a 10 cp fluid in only 36 minutes. See FIG. 2. Thus, the red colored composition of the invention provided a 50% improvement in break-time compared to the uncolored control.

Figure 3:
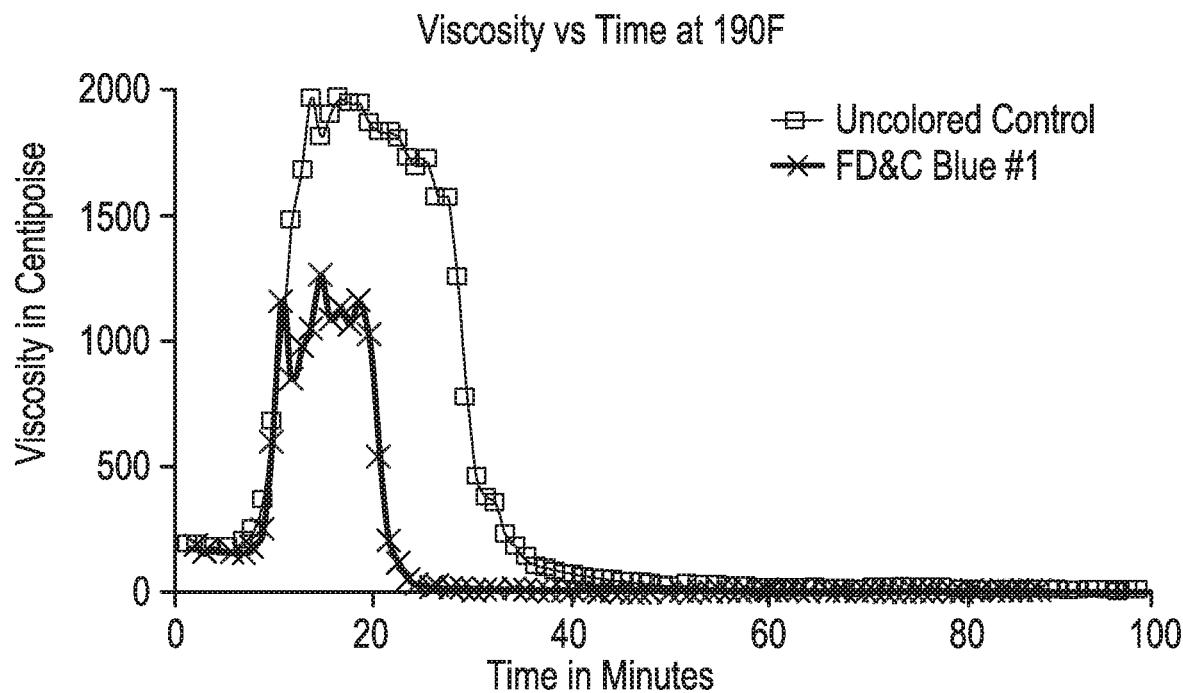

Referring to FIG. 3; 1.0GPT of 30% sodium thiosulfate, 0.04% FD&C Blue #1 and 0.95% propylene glycol in water were added to the starting fluid. Then 3.0GPT of a delayed borate crosslinker CL-610 was added and allowed to mix for 1 minute. Then 1.0 GPT of uncolored 5 wt % t-butyl hydroperoxide in water was added and allowed to mix for 1 minute at 730 rpm. This final solution referred to as "FD&C Blue #1" was tested on the Grace 5600. Before use, the Grace 5600 co-cylindrical rheometer must be turned on and warmed up for 30 min. Then 52 mls of the fracture fluid is added to the Grace 5600 sample cup and the B5 bob is then lowered into the sample cup and the unit assembled as per the published manual. The Grace 5600 rheometer break tests were performed at 190 F and 400 psi with a shear rate of 40 s−1. The fluid viscosity versus time plot using the FD&C Blue #1 composition was compared to the "Uncolored Control" wherein both curves can be found in FIG. 3.

Unexpectedly it was found that the FD&C Blue #1 fluid composition of the invention provided a more efficient (faster) break time at 190 F, versus the uncolored control formulation. The "Uncolored Control" provided a time to 10 cp viscosity of 72 minutes. In contrast, the "FD&C Blue #1" composition provided a 10 cp fluid in only 32 minutes. See FIG. 3. Thus the blue colored composition of the invention provided a 50% improvement in break-time compared to the uncolored control.

Example 2

Organic peroxide compositions were tested with varying amounts of FD&C Blue #1, FD&C Red #40, and propylene glycol. The organic peroxide included in each sample was 5% tert-butyl hydroperoxide (TBH) in water. Alcohol was then added to the aqueous organic peroxide solutions, and the resultant solutions mixed at ambient temperature; dye was then added to the mixture and the solution mixed at ambient temperature. Samples of the colored peroxide solutions were placed in temperature controlled ovens, and were removed from the ovens at regular intervals and visually inspected and/or analyzed by UV-Vis spectroscopy, using the following spectrophotometric technique. Quantitative measurements of color retention versus time and temperature were conducted by using a spectrometer made by Perkin Elmer, UV/VIS Lambda 950; Serial #950N8012403. Samples of liquid colored materials were placed in a glass cuvette designed for this purpose. An empty, blank cuvette was also placed in the reference chamber to cancel out the effect of the glass in the % transmission measurements. At this point % light transmission of the colored solution was measured using wavelengths from 300 nm to 800 nm. Color coordinates were calculated from these transmission spectra using ASTM method E 308-01. The spectral tristimulus values used in these calculations were the CIE 1964 (10°) observer values. The illuminant used was a D65 illuminant, and the color values were computed in the L*a*b* color scale against a standard D65 illuminant light % transmission vs wavelength spectra which represents essentially natural daylight. CIE Standard Illuminant D65 is a commonly used standard illuminant defined by the International Commission on Illumination. D65 corresponds roughly to a midday sun in Western Europe/Northern Europe, hence it is also called a natural daylight illuminant. The resulting raw data values of % transmission values versus wavelength in nanometers (nm) are then used to calculate the CIELAB 1976 color space parameters of L*, a* and b* and/or ΔE. It is also possible to plot the % transmission values versus wavelength. Liquid chromatography or titration could also be used to monitor the peroxide or active oxygen levels in the solutions over time.

Sample 1 contained 5% TBH, 0.04% FD&C Blue #1, and 1.0% propylene glycol in water. After 5 months at 50° C., Sample #1 exhibited no color change visible to the eye (i.e., it was completely color stable).

Sample #2 contained 5% TBH, 0.04% FD&C Blue #1, and 0.5% propylene glycol in water. After 5 months at 50° C., Sample #2 exhibited only a slight color change from blue to purple (i.e., it was substantially color stable).

Sample #3 contained 5% TBH, 0.02% FD&C Blue #1, and 0.5% propylene glycol in water. Sample #4 contained 5% TBH, 0.02% FD&C Red #40, and 0.5% propylene glycol in water. Both Samples #3 and #4 exhibited a slight decrease in color after one month at 35° C. (i.e., they were substantially color stable), and most of the color faded after one month at 43° C.

Sample #5 contained 5% TBH, 0.04% FD&C Blue #1, and 0.75% propylene glycol in water. Sample #6 contained 5% TBH, 0.04% FD&C Red #40, and 0.75% propylene glycol in water. Both Samples #5 and #6 exhibited strong color stability after three months at both 35° C. and 43.3° C. (no changes in color were observed—they were completely color stable). Based on these results, the organic peroxide compositions that exhibited the most color stability over time were those that included a 0.04% dye loading and 0.75% propylene glycol.

Example 3

In this example, a 25# guar/Mgal fracture fluid was made by adding 3.125 mL of guar viscosifying fluid to 500 mL water following the procedure listed in Example 1 (instead of 5 mls to make the previous 40# guar fluid). Here, observations were made concerning the effect of re-heal on the fracture fluid after completely breaking the fluid with a combination of 0.25 GPT Grape and 0.4 GPT Red at 170 C and 40 sec-1 shear rate and 400 psi in the Grace 5600.

The following colored fluids were added using the procedure provided in Example 1. 0.25GPT of 30% sodium thiosulfate and 0.02% Grape Shade USDB06186 and 0.95% propylene glycol in water were added to the 25# guar "starting fluid". This is referred to as 0.25 gpt grape in FIG. 4. Also added to the guar fluid was 0.40 GPT of 5 wt % t-butyl hydroperoxide, 0.04% FD&C Red #40, and 0.75% propylene glycol in water. This is the 0.4 gpt red referred to in FIG. 4.

Figure 4:
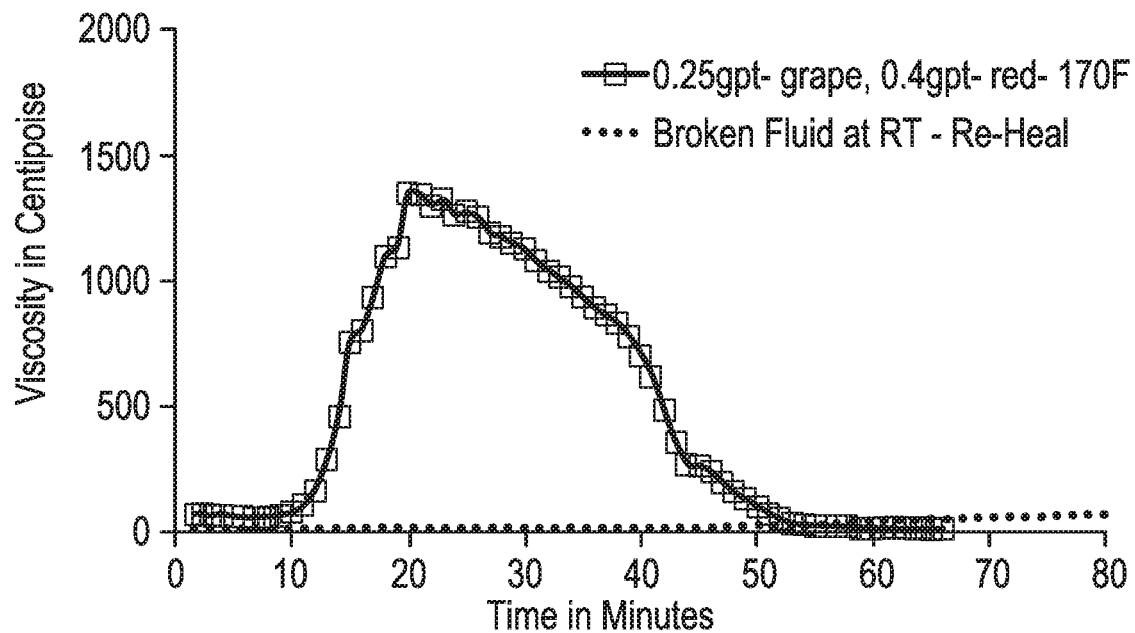
FIGS. 4-5 pertain to Example 3.

The combination of these grape and red fluids provided a complete break of the guar fracture fluid at 170 F in about 60 minutes. The completely broken guar fluid was allowed to cool to room temperature and the broken guar viscosity was re-tested. We found no re-healing of the fluid. It has been reported that guar fluids that were broken at well temperatures will re-develop high viscosity at low (~20 to 25 C room temperature). This makes recovery of the fluid more labor intensive. It is highly desirable that the broken fluid at ambient temperatures should possess low viscosity equivalent to the measured broken viscosity at the higher well temperature (in this case 170 F). The colored fluid additives of the invention provide a complete break with no re-heal as indicated by the dotted viscosity curve which re-measured the broken guar fluid at ambient temperature, as shown in FIG. 4.

Figure 5:
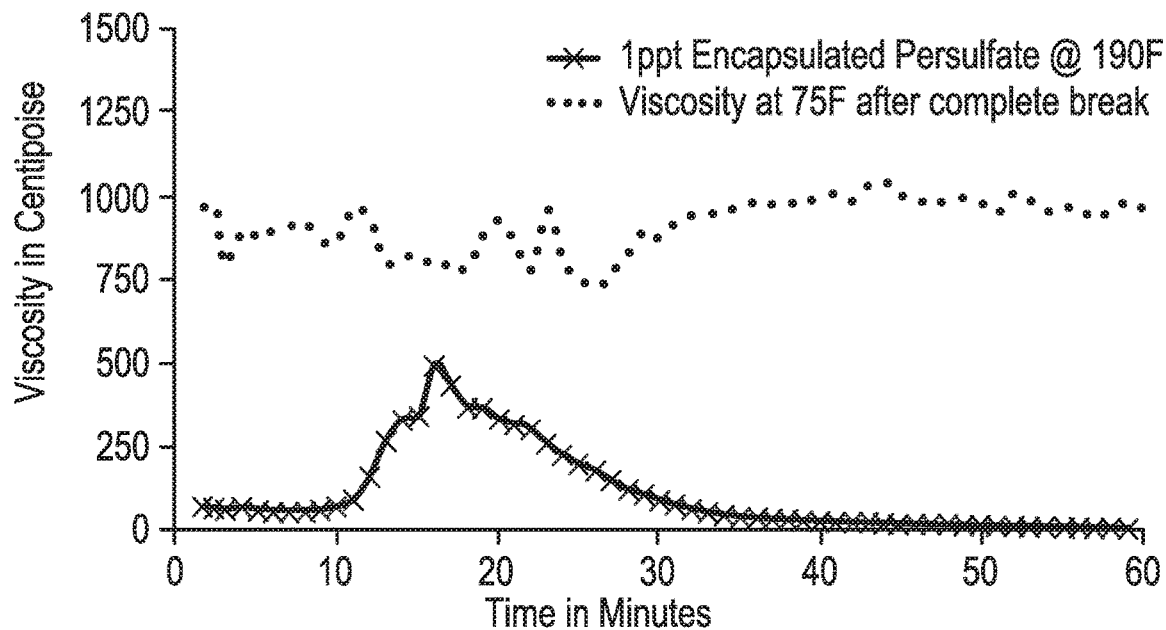

In comparison, 1.0 ppt (pounds per thousand gallons of water) of an encapsulated ammonium persulfate was used instead of the grape and red fluids. See FIG. 5 and compare it to FIG. 4. The temperature of the Grace 5600 rheometer run was 190 F at 40 sec-1 shear. A complete break was obtained as shown in FIG. 5. However, when the fluid was allowed to cool to ambient temperatures (75 F), a complete re-healing of the fluid resulted. In fact the re-healed fluid at 75 F was much higher in viscosity than the measured peak viscosity at 190 F before the complete break of the fluid by the encap. persulfate at ~60 minutes. This result in FIG. 5 is in direct contrast to the more desirable result obtained in FIG. 4 as per the practice of the invention.

Example 4

In this example using the procedure in Example 1, combinations of colored breaker and colored promoter were compared to a colorless breaker at 190 F. The Grace 5600 rheometer at 190 F was used in each case with a B5 bob, 40 sec-1 shear rate and 400 psi. The Blue Breaker is a blend of 5 wt % t-butyl hydroperoxide, 0.04% FD&C Blue #1, and 0.95% propylene glycol in water. The Grape Promoter is a blend of 30% sodium thiosulfate, 0.02% Grape Shade USDB06186 and 0.95% propylene glycol in water. The Red Breaker is a blend of 5 wt % t-butyl hydroperoxide, 0.04% FD&C Red #40, and 0.75% propylene glycol in water. The Colorless Breaker is 5 wt % t-butyl hydroperoxide in water.

Figure 6:
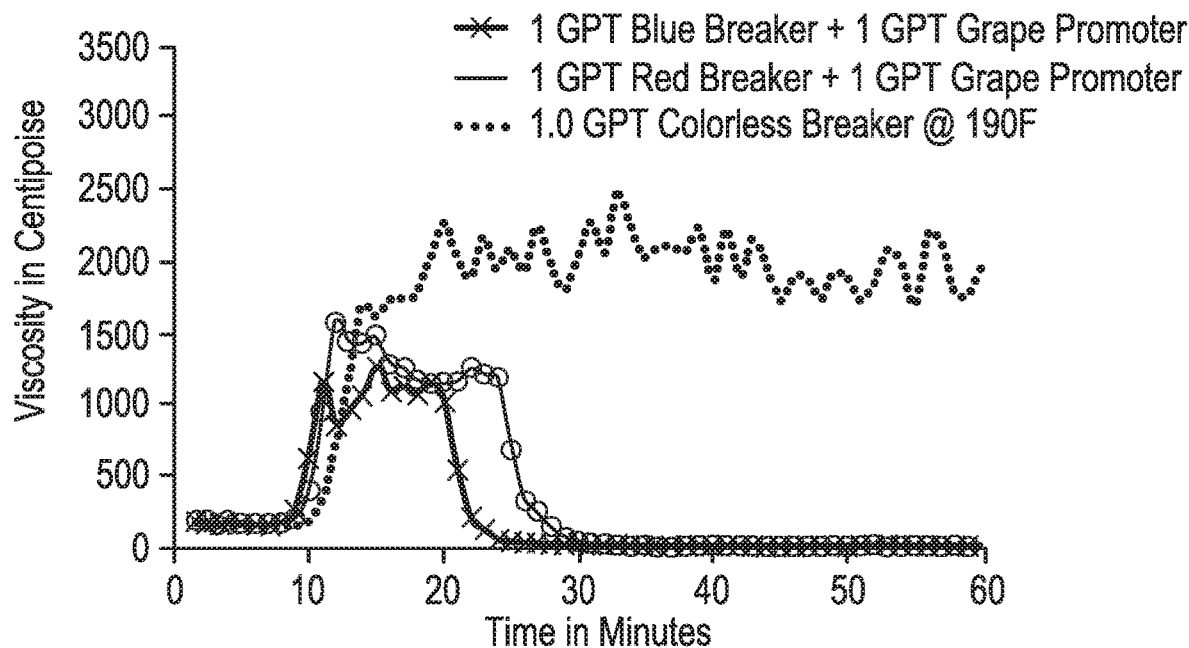
FIG. 6 pertains to Example 4.

In FIG. 6, it is demonstrated that the use of a promoter can provide a desirable break time of under one hour versus the use of a colorless breaker and no promoter (dashed line) where no break was obtained. Use of the grape promoter and red breaker gave a break time of around 35 minutes. Further improvements in break time was achieved by using the combination of the grape promoter with the blue breaker that provided a 25 minute break time.

Example 5

It was discovered that the use of select hydroxyl containing compounds unexpectedly stabilized the color intensity of the promoter and breaker compositions/solutions of the invention, which in turn, provide unexpected improvements in fracture fluid break time productivity.

Quantitative spectrometer measurements were made on the colored compositions of the invention which were subjected to time and temperature studies. Measurement of color retention versus time and temperature were conducted using a spectrometer made by Perkin Elmer, UV/VIS Lambda 950. Samples of liquid colored materials were placed in a glass cuvette. An empty, blank cuvette was also placed in the reference chamber to cancel out the effect of the glass in the % transmission measurements. Percent light transmission of the colored peroxide solution was measured using wavelengths from 300 nm to 800 nm. Color coordinates are calculated from these transmission spectra using ASTM method E 308-01. The raw data of % transmission values versus wavelength in nanometers (nm) was used to calculate the CIELAB 1976 color space parameters of $L^*$, $a^*$ and $b^*$. The $b^*$ values track the change in yellow and blue color. The $a^*$ values track any change in red and green color. Graphs of these color space parameters values allow one to study the change or lack of change in color versus time and temperature.

Figure 7:
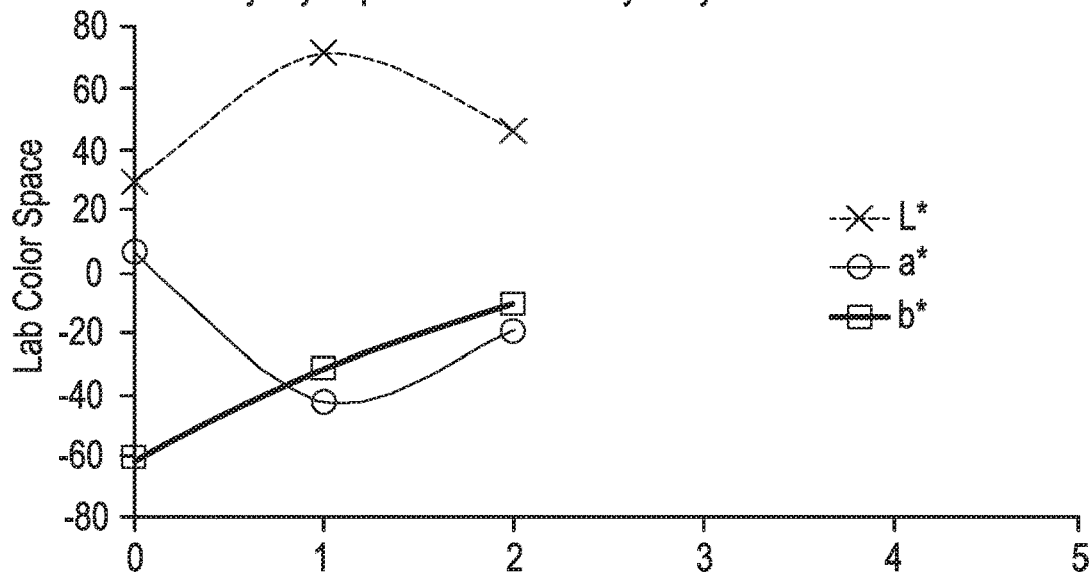
FIGS. 7-11 pertain to Example 5.

In FIG. 7 below, it was observed that without the use of the hydroxyl functional stabilizers as described herein; the blue colored peroxide solution comprising 5 wt % t-butyl hydroperoxide and 0.04 wt % FD&C Blue #1 was not color stable.

Figure 8:
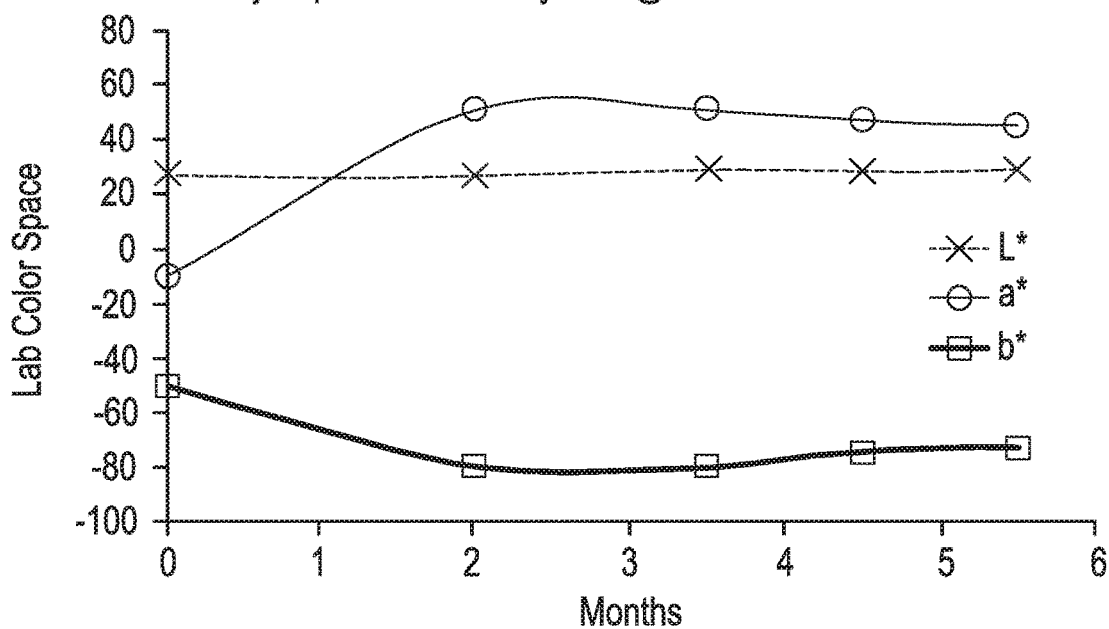
Figure 9:
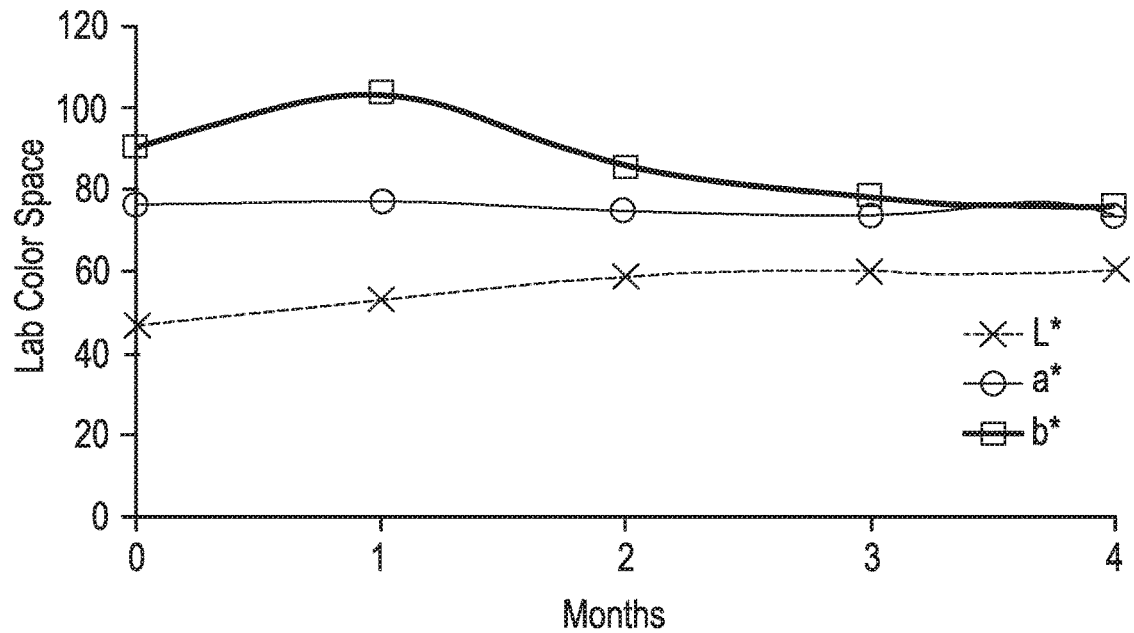

From the data in FIG. 7 at 35 C, the $b^*$ spectra data shows a linear decrease in blue color intensity that began from day one. The blue colored peroxide breaker solution continued to fade to the point where $b^*$ was now zero at two months, indicating complete loss of all blue color. In contrast, FIG. 8 shows consistent $b^*$ data was measured for five months, indicating a very stable blue peroxide breaker color retention when propylene glycol was used. In a similar fashion, consistent $a^*$ data was measured for the red colored peroxide breaker over four months as shown in FIG. 9. Positive $a^*$ spectral values track the intensity of the color red. The consistent $a^*$ spectral data in FIG. 9 demonstrates the unexpected red peroxide breaker color retention attained by use of the colored formulations of the invention comprising propylene glycol.

Figure 10:
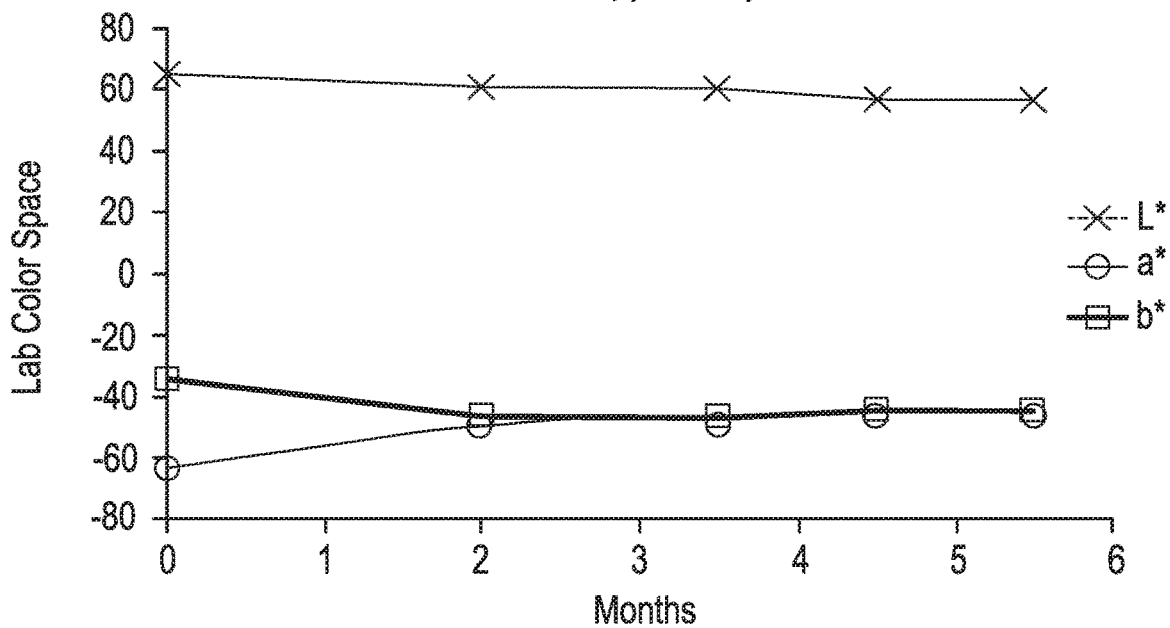
Figure 11:
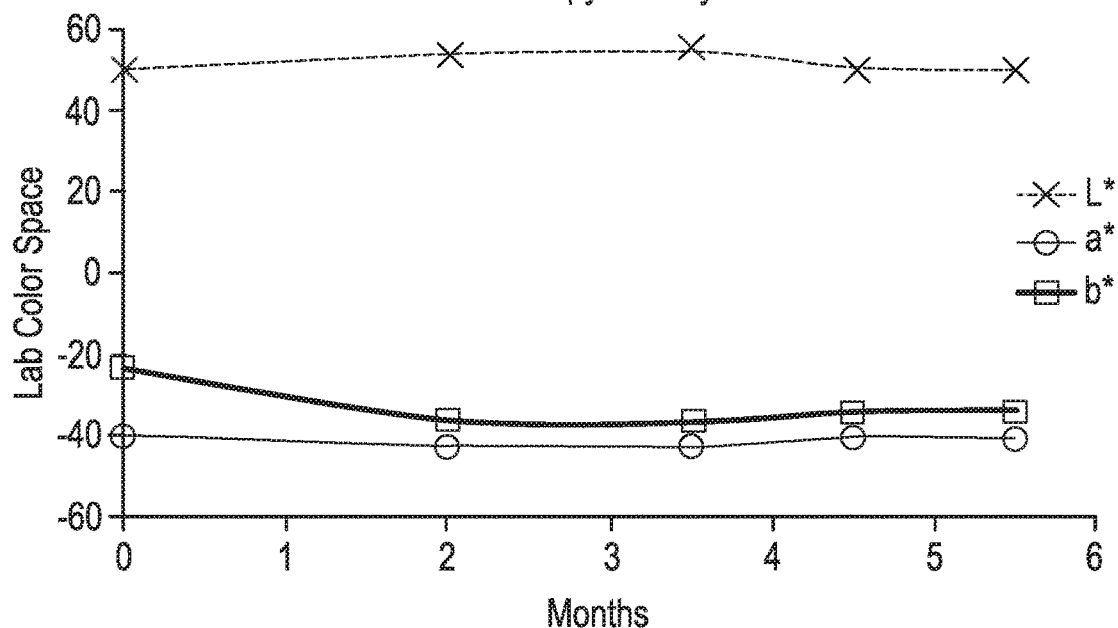

Consistent $b^*$ values versus time in months for FIGS. 10 and 11, wherein blue and grape colored 30% sodium thiosulfate promoter solutions were aged and measured for nearly 6 months at 35 C. Based on the consistent $b^*$ values, excellent color stability was confirmed when using the hydroxyl containing compound, propylene glycol as stabilizer for the 30% sodium thiosulfate promoter solution.

Example 6

Blue color stable liquid blends of the following organic peroxides were made containing 0.95 wt % propylene glycol and 0.04 wt % Unisol® Blue A dye (from United Color Manufacturing). In each case a stable color dye was obtained for at least one week based on the b* spectral data obtained as per the previously described experimental procedure.

Figure 12:
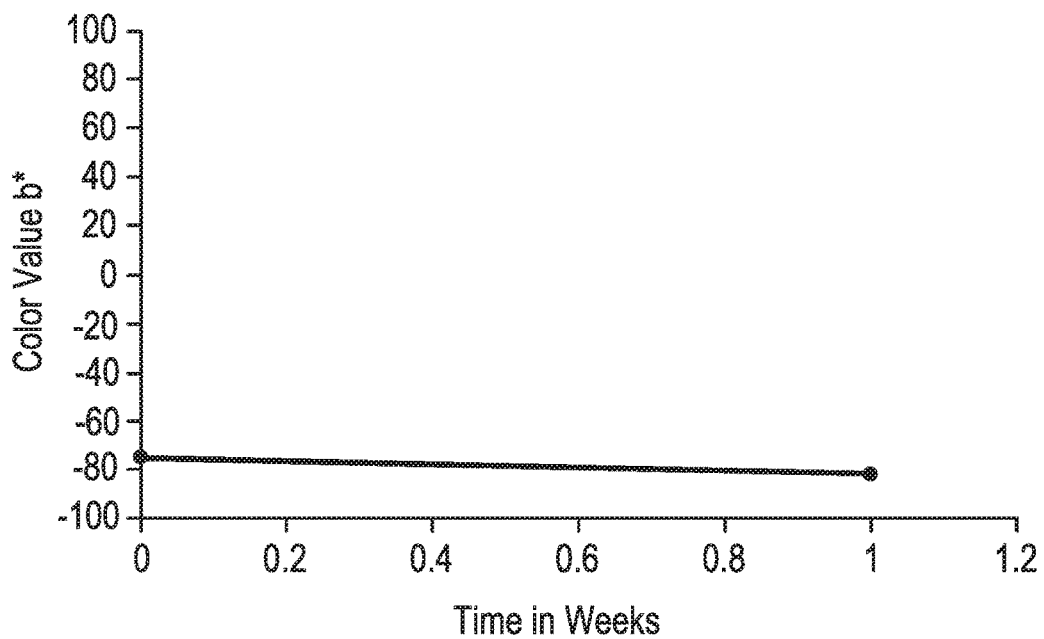
FIGS. 12-17 pertain to Example 6.
Figure 13:
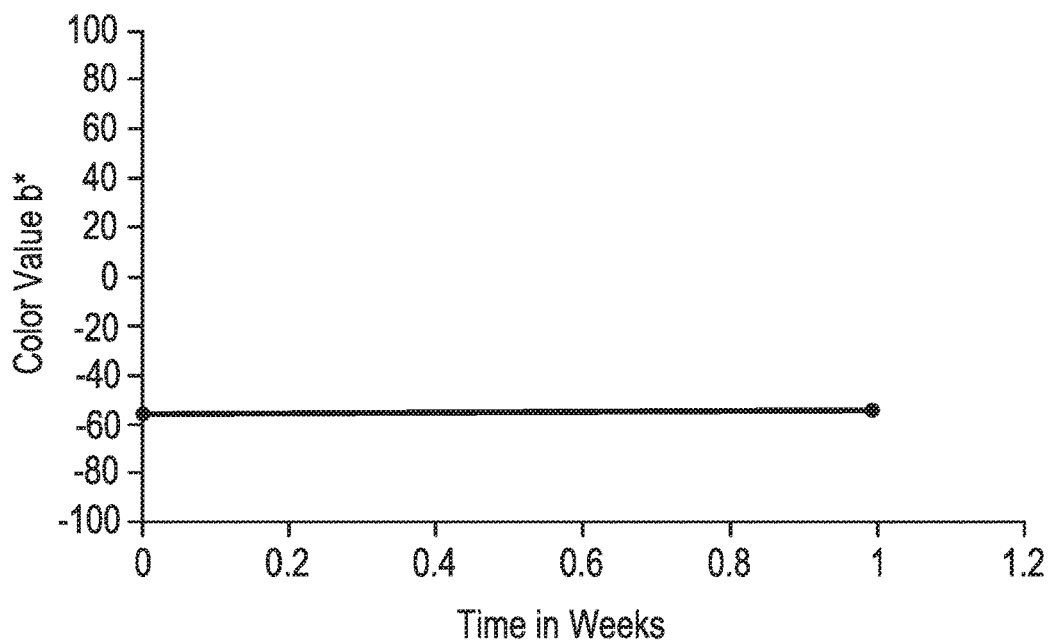
Figure 14:
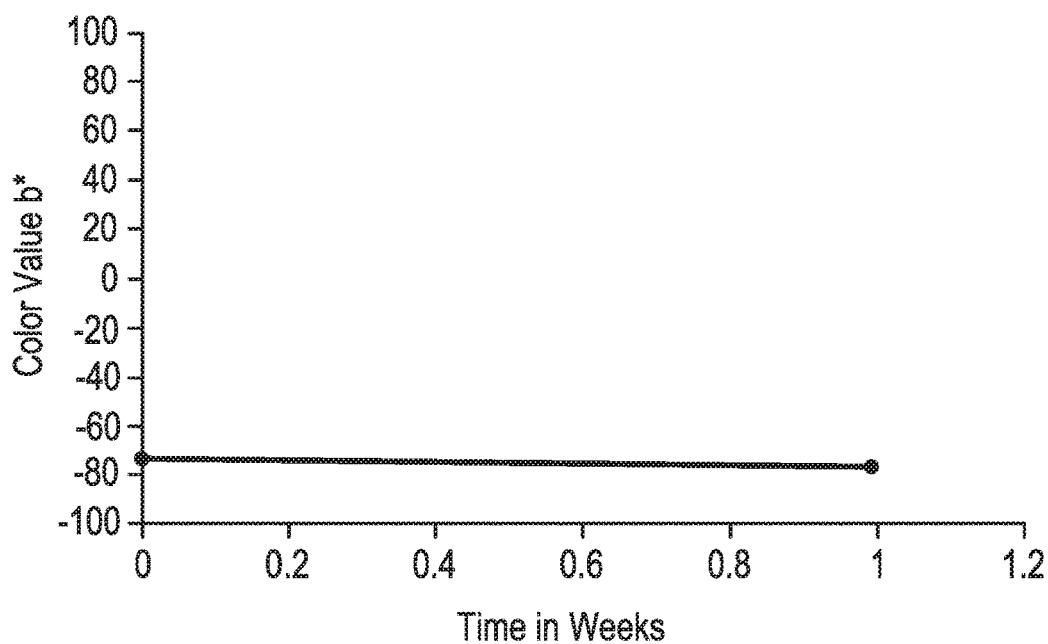
Figure 15:
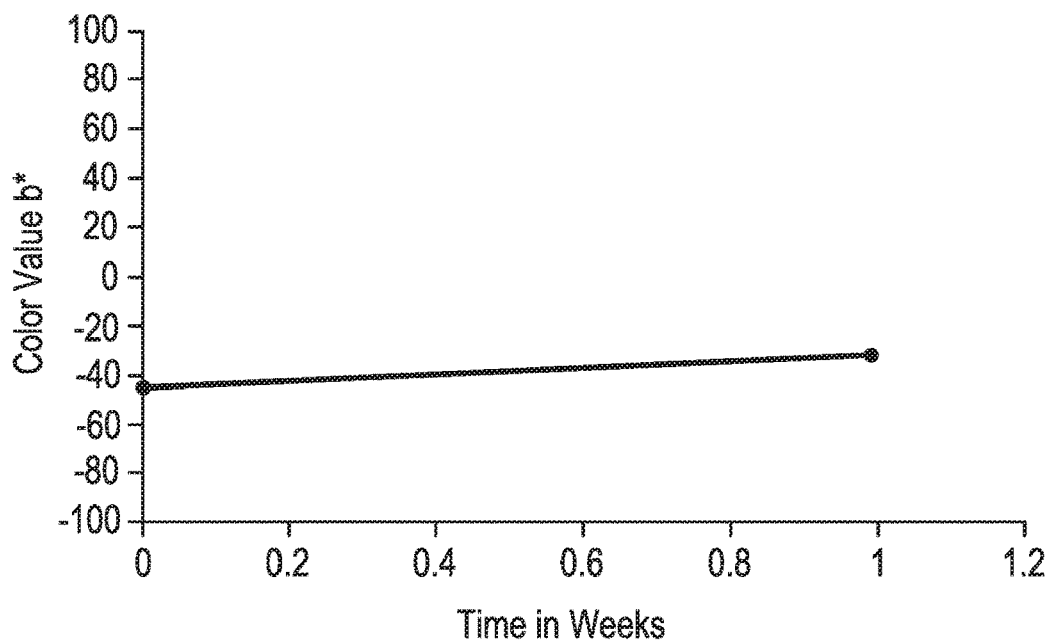
Figure 16:
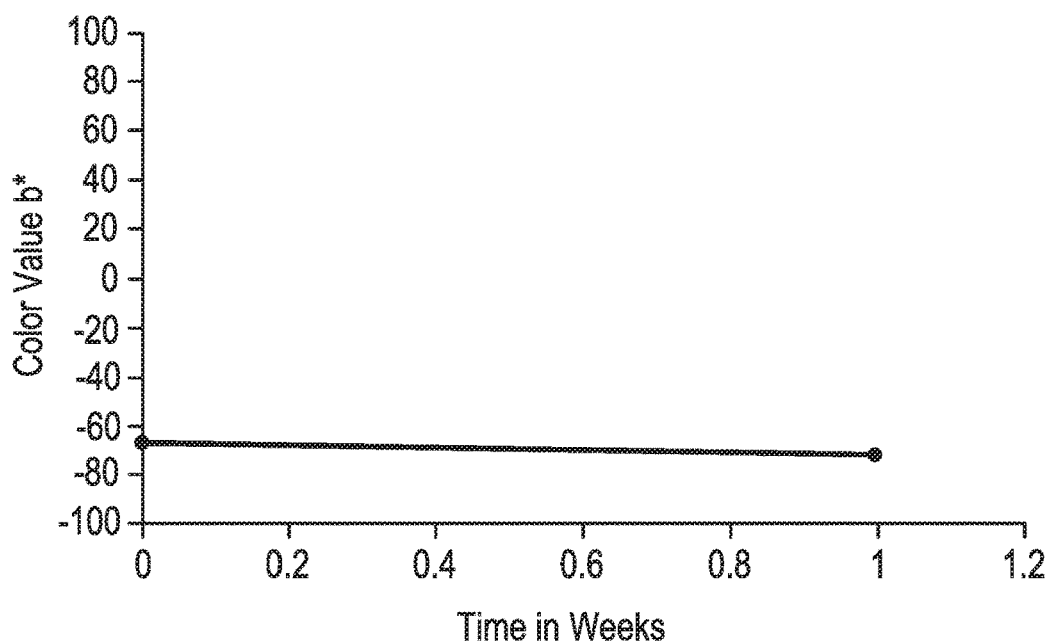
Figure 17:
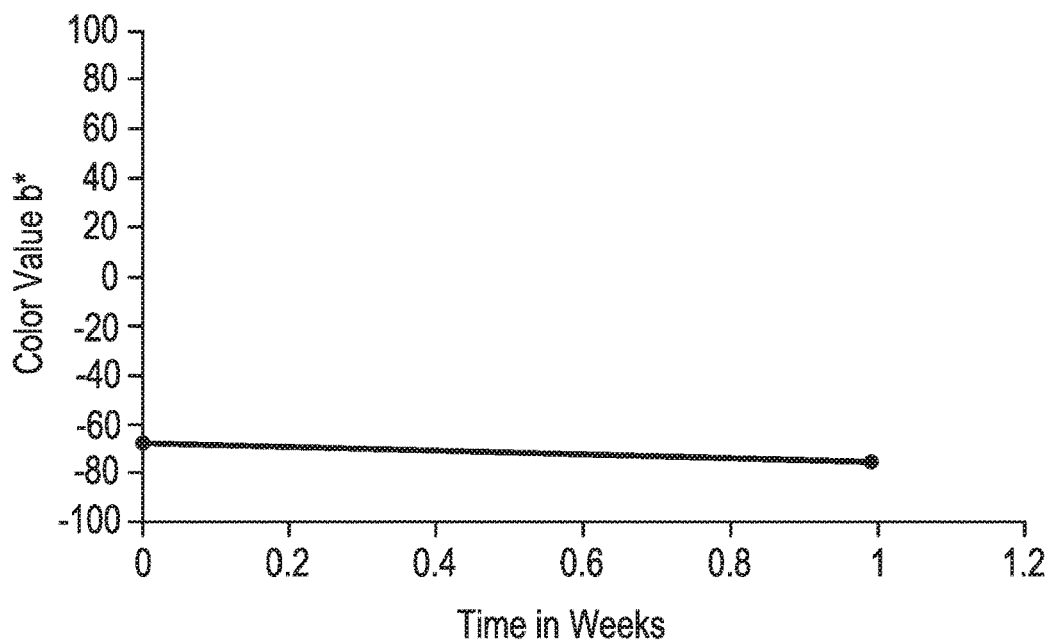

- 94% assay 2,5-dimethyl-2,5-di(t-butylperoxy)hexane; Tradename Luperox® 101 provided a stable blue color. See FIG. 12.
- 90% assay 2,5-dimethyl-2,5-di(t-butylperoxy)hexyne-3; Tradename DYBP provided a stable blue color. See FIG. 13.
- 92% assay 1,1-di(t-butylperoxy)-3,3,5-trimethylcyclohexane; Tradename Luperox® 231 provided a stable blue color. See FIG. 14.
- 96% assay t-butyl cumyl peroxide; Tradename® Luperox® D16 provided a stable blue color. See FIG. 15.
- 98% assay di-t-butyl peroxide; Tradename Luperox® DI provided a stable blue color. See FIG. 16.
- 96% assay di-t-amyl peroxide; Tradename Luperox® DTA provided a stable blue color. See FIG. 17.

These colored liquid peroxides offer considerable safety identification in the case of a spill or commercial package leakage. Normally these peroxides are essentially water-white and not easily identifiable versus ground water in a spill. Based on this data, the unexpected excellent color stability is obtained using propylene glycol.

Example 7

Blue and green colored stable liquid blends of the following organic peroxides were made containing 0.95 wt % propylene glycol and 0.04 wt % DL04169 dye from ROHA. In each case a stable color was obtained for at least one week.

Figure 18:
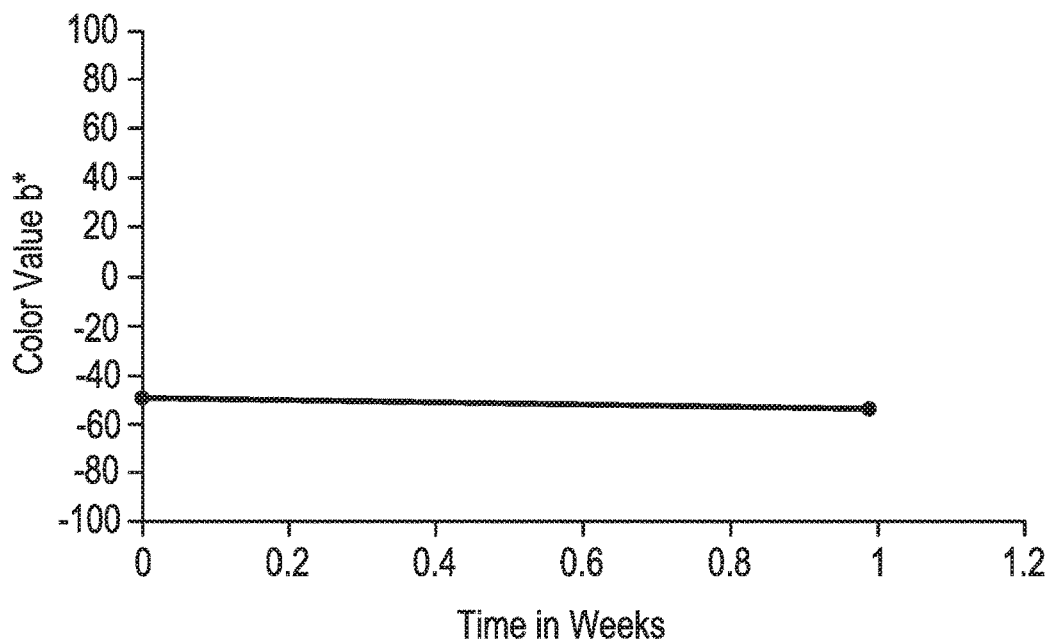
FIGS. 18-21 pertain to Example 7.
Figure 19:
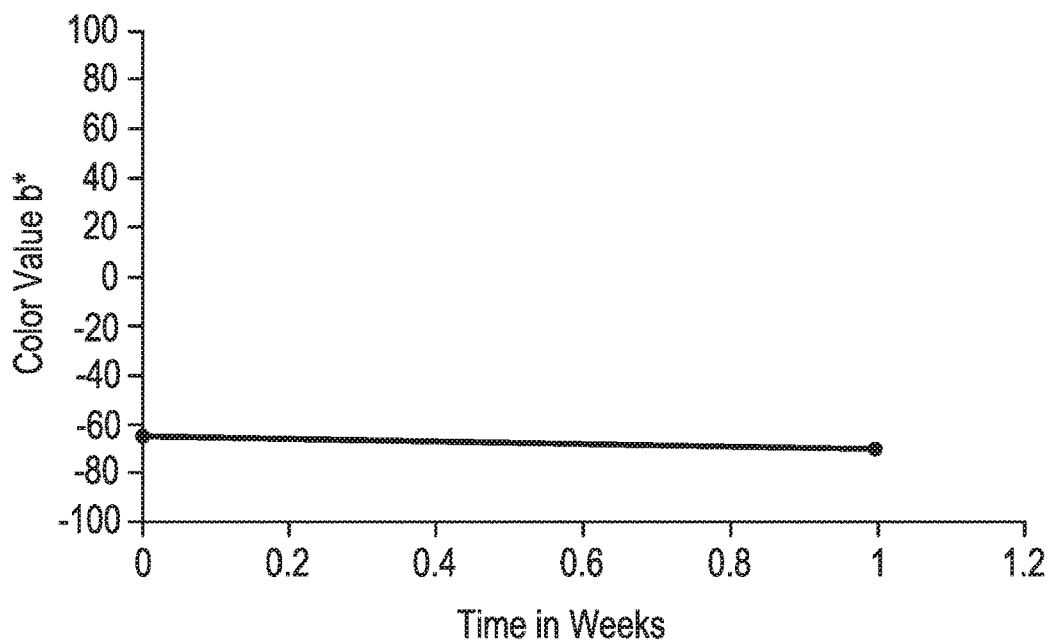

- 80% assay cumene hydroperoxide; Tradename Luperox® CU80 provided a stable blue color as per FIG. 18 and the stable b* spectral data.
- 50% assay diisopropylbenzene hydroperoxide; Tradename Luperox® DiBHP provided a stable green color as per the stable a* spectral data in FIG. 19.

These colored liquid peroxides offer considerable safety identification in the case of a spill or commercial package leakage. Normally these peroxides are essentially water-white and not easily identifiable versus ground water in a spill. Based on this data, the unexpected excellent color stability is obtained using propylene glycol.

Example 8

Red colored stable liquid blends of the following organic peroxides were made containing 0.95 wt % propylene glycol and 0.04 wt % Red 15% dye crude from Hangzhou Color Rich Chem Ltd. In each case a stable color was obtained for at least one week based upon the stable a* spectral data.

Figure 20:
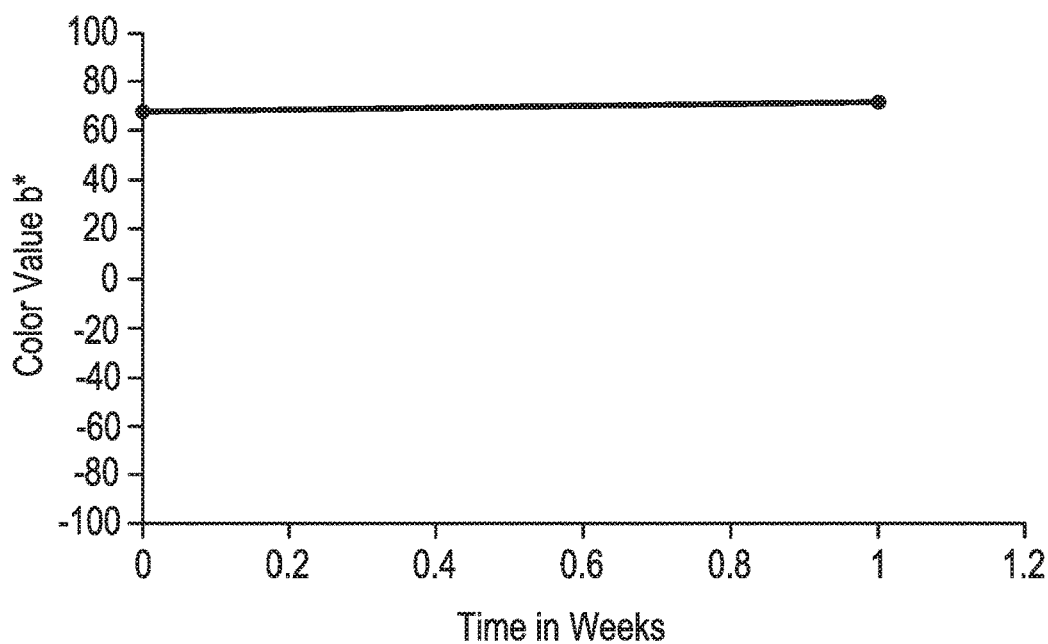
Figure 21:
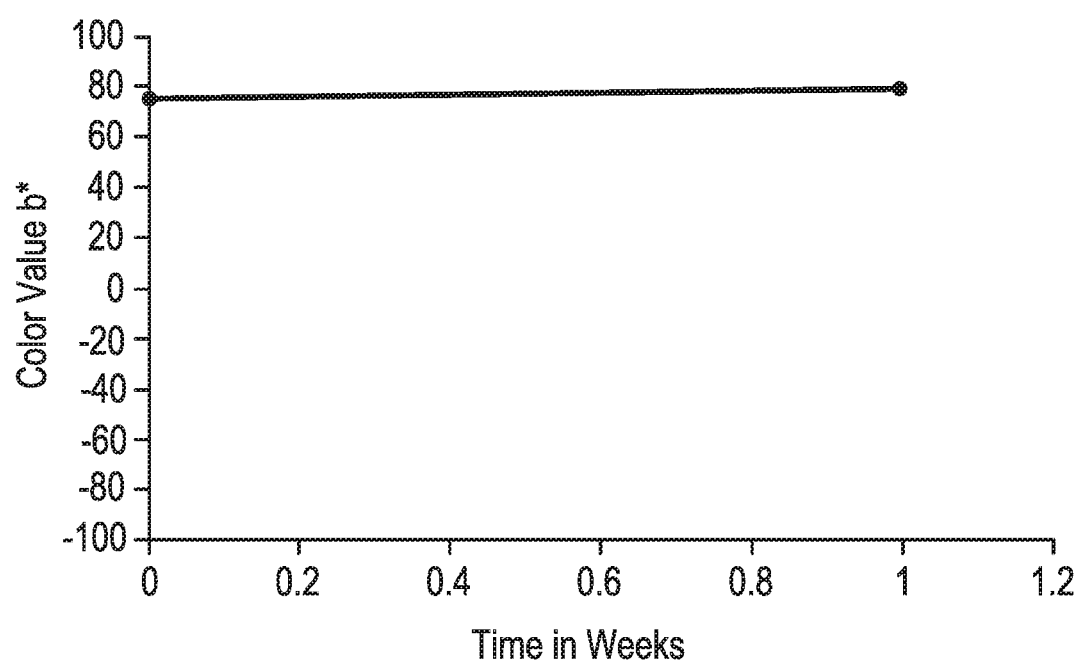

- 98% assay t-butylperoxy benzoate; Tradename Luperox® P which provided a stable red color based upon the a* spectral data in FIG. 20.
- 95% assay OO-(t-butyl)-O-(2-ethylhexyl)monoperoxy-carbonate; Tradename Luperox® TBEC which provided a stable red color based upon the a* spectral date in FIG. 21.

What is claimed is:

1. A colored breaker composition for use in an aqueous treatment fluid, the colored breaker composition comprising:
   about 85 to about 98 wt % water,
   about 1 to about 15 wt % of one or more organic peroxides selected from the group consisting of tert-butyl hydroperoxide, 2,5-dimethyl-2,5-di(t-butylperoxy)hexane; cumene hydroperoxide; 1,1-di(t-butylperoxy)-3,3,5-trimethylcyclohexane; diisopropylbenzene hydroperoxide; di-t-butyl peroxide; di-t-amyl peroxide; 2,5-dimethyl-2,5-di(t-butylperoxy)hexyne-3; t-butyl cumyl peroxide; t-butyl perbenzoate; and OO-(t-butyl)-O-(2-ethylhexyl)monoperoxycarbonate,
   about 0.001 to about 2 wt % of one or more organic metal-free dyes selected from the group consisting of FD&C Blue #1, FD&C Red #3, FD&C Red #40, FD&C Yellow #6, Purple Shade, Grape Shade, Blue Liquid, Purple Liquid, and
   about 0.01 to about 5 wt % of one or more alcohols selected from the group consisting of polyols, glycols, butyl alcohols, triols, monosaccharides, disaccharides,
   whereby the colored breaker composition reduces viscosity of the aqueous treatment fluid injected in a well bore.

2. The colored breaker composition of claim 1, wherein the one or more organic peroxides is at least tert-butyl hydroperoxide.

3. The colored breaker composition of claim 1, wherein the one or more alcohols is either propylene glycol or tert-butyl alcohol, or a combination thereof.

4. The colored breaker composition of claim 1 further comprising at least one promoter selected from the group consisting of sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, sodium sulfite, sodium bisulfite, sodium erythorbate, and combinations thereof.

5. The colored breaker composition of claim 1 which is a liquid.

* * * * *